US009862356B2

(12) United States Patent
Kim et al.

(10) Patent No.: US 9,862,356 B2
(45) Date of Patent: Jan. 9, 2018

(54) WIPER BLADE

(71) Applicant: THE KOREA DEVELOPMENT BANK, Seoul (KR)

(72) Inventors: In Kyu Kim, Ansan-si (KR); Kyung Su Kim, Cheongyang-gun (KR); Kyung Jong Nam, Cheongyang-gun (KR); Cheong Mo Yang, Cheongyang-gun (KR); Jun Mo Lee, Cheongyang-gun (KR)

(73) Assignee: THE KOREA DEVELOPMENT BANK, Seoul (KR)

( * ) Notice: Subject to any disclaimer, the term of this patent is extended or adjusted under 35 U.S.C. 154(b) by 298 days.

(21) Appl. No.: 14/615,946

(22) Filed: Feb. 6, 2015

(65) Prior Publication Data

US 2015/0239431 A1 Aug. 27, 2015

(30) Foreign Application Priority Data

Feb. 21, 2014 (KR) ........................ 10-2014-0020678

(51) Int. Cl.
B60S 1/38 (2006.01)
B60S 1/40 (2006.01)

(52) U.S. Cl.
CPC .......... B60S 1/3801 (2013.01); B60S 1/3851 (2013.01); B60S 1/4003 (2013.01); B60S 2001/3813 (2013.01); B60S 2001/3815 (2013.01); B60S 2001/408 (2013.01); B60S 2001/4035 (2013.01)

(58) Field of Classification Search
CPC .... B60S 1/3801; B60S 1/3849; B60S 1/3851; B60S 1/3853; B60S 1/3858; B60S 1/3863; B60S 2001/3812; B60S 2001/3813; B60S 2001/3815; B60S 1/4003
See application file for complete search history.

(56) References Cited

U.S. PATENT DOCUMENTS

| | | | |
|---|---|---|---|
| 6,343,401 | B1 | 2/2002 | Harashima |
| 7,636,980 | B2 | 12/2009 | Nakano |
| 8,286,298 | B2 | 10/2012 | Kim |
| 8,615,841 | B2 | 12/2013 | Kim et al. |
| 8,689,389 | B2 | 4/2014 | Kim et al. |
| 8,701,241 | B2 | 4/2014 | Kim et al. |
| 8,800,096 | B2 | 8/2014 | Kim et al. |
| 8,935,825 | B2 | 1/2015 | Song |

(Continued)

FOREIGN PATENT DOCUMENTS

| | | |
|---|---|---|
| CN | 101767572 A | 7/2010 |
| CN | 202098382 U | 1/2012 |

(Continued)

Primary Examiner — Gary Graham
(74) Attorney, Agent, or Firm — Sughrue Mion, PLLC

(57) ABSTRACT

A wiper blade having a spoiler-integrated lever assembly. The lever assembly of the wiper blade includes a connector seat to which a connector assembly for connection to a wiper arm is detachably connected. The connector assembly is detachably joined to the connector seat by inserting an insertion protrusion of the connector assembly to an insertion slot of the connector seat and then rotating the connector assembly towards the connector seat and thus bringing snap protrusions of the connector seat into snap-engagement with snap slots of the connector assembly.

13 Claims, 21 Drawing Sheets

(56) References Cited

U.S. PATENT DOCUMENTS

| | | | | |
|---|---|---|---|---|
| 2012/0159733 A1* | 6/2012 | Kwon | ............... | B60S 1/3801 15/250.3 |
| 2012/0180245 A1* | 7/2012 | Ku | ............ | B60S 1/3801 15/250.32 |
| 2012/0180247 A1* | 7/2012 | Ku | ............ | B60S 1/3853 15/250.32 |
| 2013/0255025 A1 | 10/2013 | Song et al. | | |

FOREIGN PATENT DOCUMENTS

| | | |
|---|---|---|
| KR | 2001-0030699 A | 4/2001 |
| KR | 10-2006-0051763 A | 5/2006 |
| KR | 10-0903374 B1 | 6/2009 |
| KR | 10-1036577 B1 | 5/2011 |
| KR | 10-1130039 B1 | 3/2012 |
| KR | 10-1130977 B1 | 3/2012 |
| KR | 10-1170905 B1 | 8/2012 |
| KR | 10-1201547 B1 | 11/2012 |
| KR | 10-1207768 B1 | 12/2012 |
| KR | 10-1245514 B1 | 4/2013 |
| KR | 10-2014-0000779 A | 1/2014 |

\* cited by examiner

WIPER BLADE

CROSS-REFERENCE TO RELATED APPLICATIONS

This application claims priority from Korean Patent Application No. 10-2014-0020678 (filed on Feb. 21, 2014), the entire subject matter of which is incorporated herein by reference.

TECHNICAL FIELD

The present disclosure relates to a wiper blade with a spoiler integrated therein.

BACKGROUND

A wiper blade for wiping a surface of a windshield has a wiper rubber and a lever assembly. The wiper rubber contacts the windshield surface. The lever assembly holds and supports the wiper rubber along its longitudinal direction. The lever assembly of a conventional wiper blade includes one main lever and a plurality of yoke levers linked to the main lever. The main lever is connected to the wiper arm. The yoke lever is linked to the main lever or another yoke lever at its middle. The main lever and the yoke lever are hinge-connected by means of a pin or rivet which passes through the main lever and the yoke lever.

When a motor vehicle runs, wind or air stream impinging against the windshield applies a force to the wiper blade throughout the longitudinal direction of the wiper blade. The force caused by the wind or air stream acts to lift the wiper blade from the windshield surface. The faster the motor vehicle runs, the stronger such a lift force becomes. This weakens the contact between the wiper rubber and the windshield surface, thereby deteriorating wiping performance.

To address the deterioration in wiping performance caused by the lift of a wiper blade, it is known in the art to attach a spoiler to the wiper blade. The spoiler interacts with wind or air stream and thereby applies a force in a direction opposite to the lift of the wiper blade. By way of example, Korean Patent Application Publication No. 2001-0030699 proposes a wiper blade with a spoiler attached to a main lever. It is also known in the art to attach a cover, which covers the main lever or the yoke lever of the wiper blade and has the shape of a spoiler, to the wiper blade. By way of another example, Korean Patent Application Publication No. 2006-0051763 proposes a wiper blade with such a cover.

SUMMARY

The lower an overall height of the lever assembly supporting the wiper blade, the less air resistance the lever assembly could be subjected to. However, to reduce the height of the lever assembly of conventional wiper blade has limits due to a furcate configuration of its levers. The wiper blade with a spoiler attached requires that the spoiler be prepared separately. This may lead to the increase in manufacturing costs of the wiper blade and detachment of the spoiler. Further, the wiper blade with a cover covering the main lever or the yoke lever requires parts for joining the cover to the lever assembly. This may increase the number of the parts of the wiper blade, increasing manufacturing costs.

Further, in the lever assembly of a conventional wiper blade, the main lever and the yoke lever are connected by means of a connection element such as a pin or rivet. Use of such a connection element may increase the number of the parts of the wiper blade and easy assembly of the wiper blade cannot be achieved.

The wiper blade is connected to the wiper arm through detachable connection between a connection unit provided in the wiper blade and a coupling unit provided in a distal end of the wiper arm. Various coupling units of wiper arms are used in the art and wiper blades employ variously-configured connection units, each of which is suitable for the respective coupling units. Thus, wiper blade manufacturers must design and develop various connection units, each of which is only suitable for the respective coupling units of wiper arms. The connection unit has a base part, which constitutes the base of the connection unit, and a connection part, which is attached to the base part and is configured to be joined to the coupling unit. Various designs of the base part must be made so as to be suitable for various designs of the connection parts. This increases the type and number of parts constituting the connection unit, resulting in increased manufacturing costs.

The present disclosure is directed to solving the aforementioned problems of the prior art. The present disclosure provides a wiper blade wherein a lever assembly holding a wiper rubber has a low overall height and is integrated with a spoiler. Further, the present disclosure provides a wiper blade wherein the lever assembly can be assembled through simple manipulation. Further, the present disclosure provides a wiper blade having the aforementioned characteristics, wherein the base part of a connector assembly is easily assembled to a lever assembly with simple manipulation.

Embodiments disclosed herein provide a wiper blade wherein a spoiler is integrated in a lever assembly configured to hold a wiper rubber.

In one exemplary embodiment, a wiper blade comprises a wiper rubber, a lever assembly holding the wiper rubber, a connector seat provided in the lever assembly, and a connector assembly detachably joined to the connector seat. The lever assembly includes a plurality of levers, adjacent levers of which are rotatably connected. At least one of the plurality of levers has an inclined surface defining a partial spoiler extending in a longitudinal direction of the lever assembly. The connector seat is provided in a first lever that is centrally located in the lever assembly. The connector seat includes: a seat surface on which the connector assembly is seated; an insertion slot provided at a longitudinal end of the seat surface; and a pair of snap protrusions located adjacent to the seat surface apart from the insertion slot. The connector assembly is detachably connected to a distal end of a wiper arm. The connector assembly includes: a contact surface contacting the seat surface; an insertion protrusion inserted to the insertion slot of the connector seat; and a pair of snap slots which the pair of snap protrusions of the connector seat snap-engage respectively. The connector assembly is joined to the connector seat by inserting the insertion protrusion to the insertion slot and then rotating the connector assembly towards the connector seat and thus bringing the snap protrusions into snap-engagement with the snap slots.

In an embodiment, the connector seat further includes a stepped surface that extends along a periphery of the seat surface and separates the seat surface from the first lever, and the connector assembly further includes a flange that extends along a periphery of the contact surface and fits on the stepped surface. The pair of snap slots are located above a bottom edge of the flange.

In an embodiment, the flange includes an ear portion formed by a portion of an edge of the flange. Said portion of an edge of the flange is opposite each of the snap slots and protrudes outwardly.

In an embodiment, the seat surface includes: a flat surface extending longitudinally and being lower than a top edge of the first lever; and inclined surfaces inclined from respective longitudinal outer ends of the flat surface towards respective longitudinal outer ends of the first lever. The connector seat includes a recess in one of the inclined surfaces and the connector assembly includes an insertion portion inserted to the recess. The insertion slot is formed in the recess and the insertion protrusion is located at a tip end of the insertion portion.

In an embodiment, a distance between longitudinal inner ends of the stepped surface is less than a distance between a tip end of the insertion protrusion and an edge of the flange located opposite the insertion protrusion. Further, one of the longitudinal inner ends of the stepped surface is higher than the other of the longitudinal inner ends of the stepped surface.

In another exemplary embodiment, a wiper blade comprises a wiper rubber, a first lever, a pair of second levers, a pair of third levers, a connector seat provided in the first lever, and a connector assembly including a bracket detachably joined to the connector seat. The first lever has two first inclined surfaces that extend longitudinally and are spaced apart from each other. The second levers are rotatably connected to respective longitudinal outer ends of the first lever and have a finger for grasping the wiper rubber at a longitudinal inner or outer end thereof. Further, each of the second lever has a second inclined surface extending longitudinally. The third levers are rotatably connected to respective longitudinal inner or outer ends of the second levers opposite the respective fingers of the second levers. Each of the third levers has fingers for grasping the wiper rubber at respective longitudinal ends thereof. The connector seat is provided in the first lever between the first inclined surfaces. The connector seat includes: a seat surface on which the bracket is seated; a stepped surface extending along a periphery of the seat surface and separating the seat surface from the first lever; an insertion slot provided at a longitudinal end of the seat surface; and a pair of snap protrusions located adjacent to the seat surface apart from the insertion slot and protruding in a direction orthogonal to a longitudinal direction of the seat surface. The connector assembly is detachably connected to a distal end of a wiper arm. The bracket of the connector assembly includes: a contact surface contacting the seat surface; a flange extending along a periphery of the contact surface and fitting on the stepped surface; an insertion protrusion inserted to the insertion slot of the connector seat; and a pair of snap slots which the pair of snap protrusions of the connector seat snap-engage respectively. The pair of snap slots are located above a bottom edge of the flange.

In an embodiment, the flange includes an ear portion formed by a portion of an edge of the flange. Said portion of an edge of the flange is opposite each of the snap slots and protrudes outwardly. Further, the connector seat includes an auxiliary stepped surface between the stepped surface and a bottom edge of the first lever. The auxiliary stepped surface is continued from the stepped surface and is located below the snap protrusion.

In an embodiment, the seat surface comprises: a flat surface extending longitudinally and being lower than a top edge of the first lever; and inclined surfaces inclined from respective longitudinal outer ends of the flat surface towards respective longitudinal outer ends of the first lever. The connector seat includes a recess in one of the inclined surfaces and the bracket includes an insertion portion inserted to the recess. The insertion slot is formed in the recess and the insertion protrusion is located at a tip end of the insertion portion. In this embodiment, the stepped surface comprises: a lateral stepped surface adjoining lateral edges of the flat surface and the inclined surfaces; and first and second top stepped surfaces adjoining top ends of the inclined surfaces respectively. The first top stepped surface is adjacent to the insertion slot and is higher than the second top stepped surface. Further, a distance between a longitudinal inner end of the first top stepped surface and a longitudinal inner end of the second top stepped surface is less than a distance between a tip end of the insertion protrusion and an edge of the flange located opposite the insertion protrusion. Further, the connector seat includes a positioning ridge protruding from the flat surface, and the bracket includes a positioning slot, to which the positioning ridge is fitted, in the contact surface.

In an embodiment, the first lever and the second lever are rotatably connected to each other by fitting between a pair of fitting protrusions provided in one of the first and second levers and a pair of fitting holes provided in the other of the first and second levers. The second lever and the third lever are rotatably connected to each other by fitting between a pair of fitting protrusions provided in one of the second and third levers and a pair of fitting holes provided in the other of the second and third levers.

In an embodiment, the finger of the second lever is located at the longitudinal inner end of the second lever. The third lever has a third inclined surface extending longitudinally and is rotatably connected to the longitudinal outer end of the second lever. Further, the third lever includes a pressing portion that is located opposite to the finger located at the longitudinal outer end thereof and presses the wiper rubber against the finger located at the longitudinal outer end thereof.

In an embodiment, the first lever has an end surface, which is inclined towards a longitudinal outer end of the third lever, at the longitudinal outer end thereof. The second lever has a stepped surface, which is contactable to the end surface of the first lever and is inclined towards the longitudinal outer end of the third lever, and has an end surface, which is inclined towards the longitudinal outer end of the third lever, at the longitudinal outer end thereof. The third lever has a stepped surface which is contactable to the end surface of the second lever and is inclined towards the longitudinal outer end of the third lever. The stepped surface of the third lever is inclined towards the longitudinal outer end of the third lever at an angle less than the stepped surface of the second lever.

In the wiper blades according to the embodiments, the levers with partial spoilers are adjoined linearly and form the lever assembly, providing the wiper blade that has a low overall height and an integrally-formed spoiler.

In the lever assembly of the wiper blades according to the embodiments, adjacent levers are hinge-connected to each other by fitting between fitting protrusions and fitting holes, providing a lever assembly of a wiper blade with the benefit of ease of assembly.

The base part of the connector assembly of the wiper blades according to the embodiments is joined to the lever assembly at only one position with simple manipulation.

Thus, the worker or user is capable of joining the connector assembly to the lever assembly with ease and simplicity.

BRIEF DESCRIPTION OF THE DRAWINGS

Arrangements and embodiments may be described in detail with reference to the following drawings in which like reference numerals refer to like elements or components, wherein.

DETAILED DESCRIPTION

Figure 1:
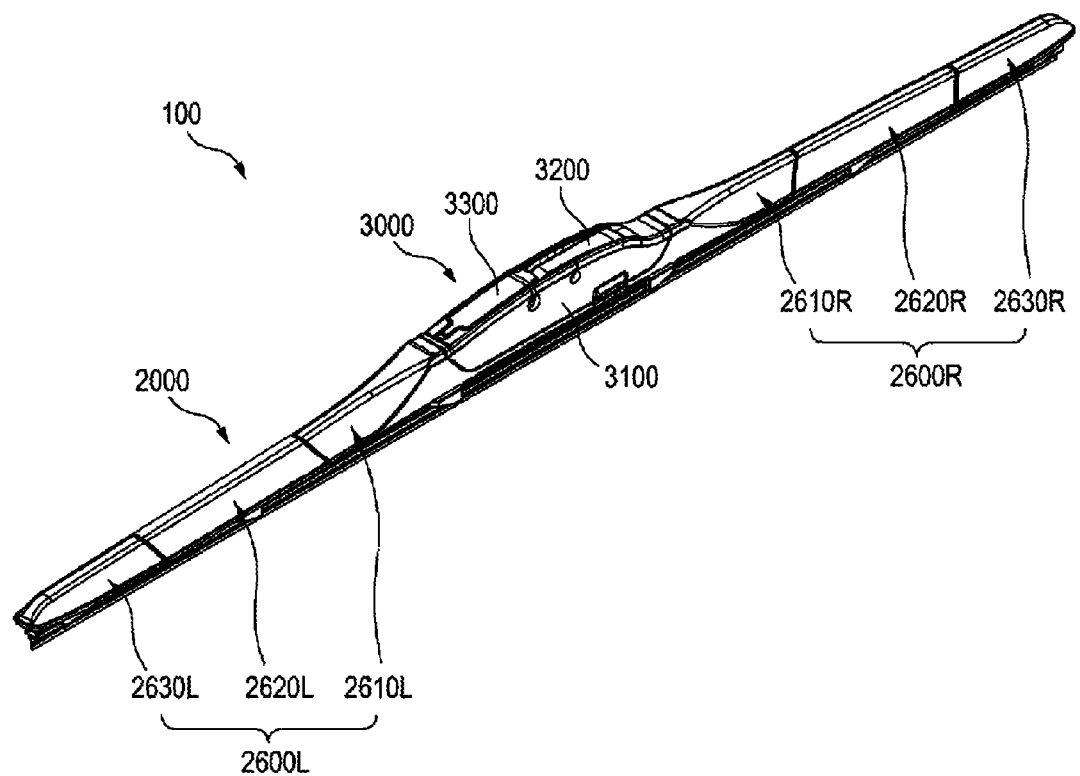
FIG. 1 is a perspective view showing a wiper blade in accordance with an embodiment.
Figure 2:
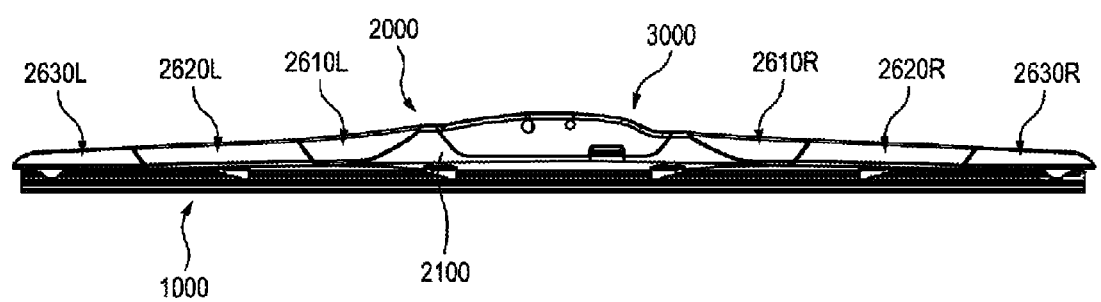
FIG. 2 is a front view of the wiper blade shown in FIG. 1.
Figure 3:
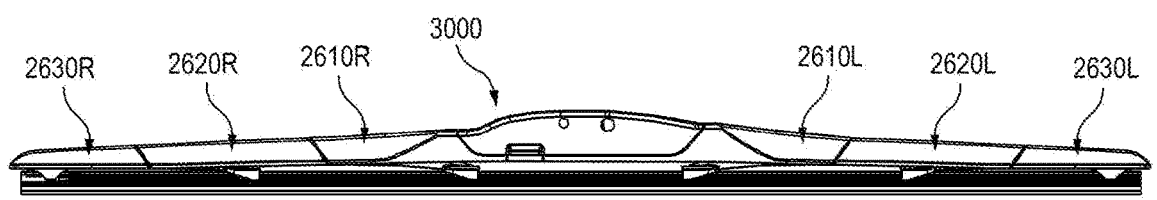
FIG. 3 is a rear view of the wiper blade shown in FIG. 1.
Figure 4:
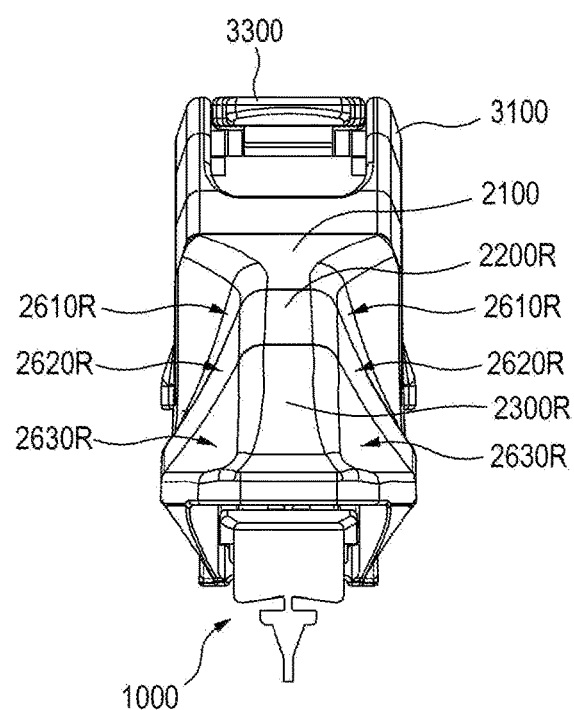
FIG. 4 is a right side view of the wiper blade shown in FIG. 1.
Figure 5:
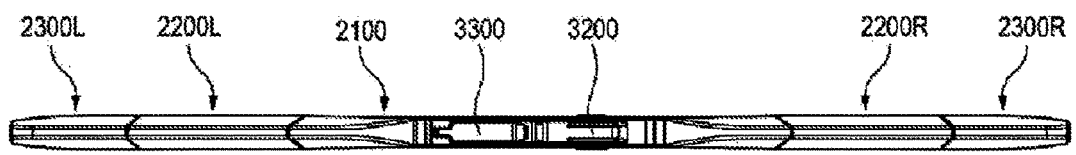
FIG. 5 is a top view of the wiper blade shown in FIG. 1.

Detailed descriptions are made as to embodiments of a wiper blade with reference to the accompanying drawings. The directional term "top," "upper," "upward" or the like as used herein is generally based on a direction, in which a lever assembly is disposed relative to a wiper rubber in the accompanying drawings, while the directional term "bottom," "lower," "downward" or the like generally refers to a direction opposite to the upper or upward direction. A wiper blade shown in the accompanying drawings may be otherwise oriented and the aforementioned directional terms may be interpreted accordingly. Further, as used herein, the term "longitudinal inner end" generally refers to an end that is closer to a center of a wiper blade in a longitudinal direction of an element, while the term "longitudinal outer end" refers to an end that is distant from the center of the wiper blade in the longitudinal direction of said element.

A wiper blade 100 according to an embodiment includes a wiper rubber assembly 1000, a lever assembly 2000 and a connector assembly 3000. The wiper rubber assembly 1000 includes a wiper rubber 1100 contacting the surface of a windshield. The lever assembly 2000 holds and supports the wiper rubber assembly. The connector assembly 3000 is detachably joined to the lever assembly 2000 and connects the lever assembly 2000 to a wiper arm.

The lever assembly 2000 includes a plurality of levers, which are adjoined linearly in a longitudinal direction of the wiper rubber 1100. Adjacent two levers are rotatably connected to each other by means of a hinge-connection portion, which directly hingedly interconnects the inner surface of one of the adjacent two levers and the outer surface of the other of the adjacent two levers. If the adjacent two levers are connected, then the outer surface of the other of said adjacent two levers is situated inside the inner surface of the one of said adjacent two levers and is thus hidden in the inside of the one of said adjacent two levers when viewed from outside. In one embodiment, the inner surface of the one of said adjacent two levers is the inner surface of a spoiler portion, while the outer surface of the other of said adjacent two levers is the outer surface of an arm portion formed in the lever. In one embodiment, said hinge-connection portion comprises a pair of fitting protrusions 2411, 2412 and a pair of fitting holes 2421, 2422 to which the fitting protrusions 2411, 2412 are fitted respectively. The fitting protrusion 2411, 2412 are provided in the one of said adjacent two levers, while the fitting holes 2421, 2422 are provided in the other of said adjacent two levers.

In embodiments, one of said adjacent two levers has an element configured to contact the other of said adjacent two levers in a width direction so that the other of said adjacent two levers hinge-joined to the one of said adjacent two levers can be retained without shake. In one embodiment, said element comprises a pair of contact surfaces, which are oppositely located inside the one of said adjacent two levers.

The wiper blades according to embodiments include a spoiler 2600L, 2600R that produces a reaction force preventing the lift of the wiper blade, which wind or air stream may cause. The spoiler extends along the longitudinal direction of the lever assembly 2000 and is integrated in the lever assembly 2000. The spoiler 2600L, 2600R reacts to wind or air stream impinging against the wiper blade 100 during the running of a motor vehicle and produces a reaction force preventing the wiper blade 100 from being lifted. Such a reaction force is produced by interaction between wind or air stream and a cross-sectional contour shape of the lever assembly 2000 with the spoiler 2600L, 2600R. In one embodiment, a partial spoiler, which becomes a part of the spoiler, is integrated in one or more levers among the plurality of levers of the lever assembly 2000. The partial spoilers of each lever are adjoined linearly, thereby forming the spoiler 2600L, 2600R of the wiper blade 100. The partial spoiler is defined by at least one or a pair of inclined surfaces that extend in the longitudinal direction of the lever and are inclined inwardly of the lever in the width direction of the lever. The inclined surface forms a portion or the entirety of a lateral surface of the lever. In an example where the lever has one inclined surface, the lateral surface of the lever, which is opposite the inclined surface, may be a vertical surface. In another example where the lever has a pair of inclined surfaces, the pair of inclined surfaces may be the portion or the entirety of the both lateral surfaces of the lever. The inclined surface may include a flat surface, a concave or convex curved surface, etc., when viewing the lever from a side or cross-section. That is, in an example where the lever has one inclined surface, the cross-sectional contour shape of the spoiler 2600L, 2600R comprises a straight line, a concave curved line or a convex curved line. In another example where the lever has a pair of inclined surfaces, the cross-sectional contour shape of the spoiler 2600L, 2600R comprises a pair of straight lines, a pair of concave curved lines or a pair of convex curved lines, which are symmetrical in the width direction of the lever assembly 2000. Further, when viewing the lever from the side or cross-section, the inclined surfaces may be at least partially symmetrical in the width direction of the lever. One of the pair of the inclined surfaces may have a width greater than that of the other. Further, the width of the inclined surface may be constant or diminish towards a longitudinal outer end of the lever assembly.

Two or more levers of the lever assembly 2000 have a spoiler portion, in which the inclined surface is formed, and an arm portion, which linearly extends oppositely from the spoiler portion. A finger, which is an element for grasping the wiper rubber, is provided at a distal end of the arm portion. When adjacent levers are joined, the arm portion of one of the adjacent levers is hidden within the spoiler portion of the other of the adjacent levers.

In one embodiment, the lever assembly 2000 comprises a first lever 2100 centrally located in the lever assembly, and a pair of second levers rotatably connected to longitudinal outer ends of the first lever respectively. The second lever has a finger grasping the wiper rubber at a longitudinal outer end or has fingers grasping the wiper rubber at longitudinal both ends. By way of another example of the lever assembly, the lever assembly 2000 comprises the following: a first lever 2100 centrally located in the lever assembly; a pair of second levers rotatably connected to longitudinal outer ends of the first lever respectively and having the finger at a longitudinal outer end; and a pair of third levers rotatably connected to the longitudinal inner ends of the second levers respectively and having fingers at longitudinal both ends. By way of yet another example of the lever assembly, the lever assembly 2000 comprises the following: a first lever 2100 centrally located in the lever assembly; a pair of second levers rotatably connected to longitudinal outer ends of the first lever respectively and having the finger at a longitudinal inner end; and a pair of third levers rotatably connected to the longitudinal outer ends of the second levers respectively and having fingers at longitudinal both ends. By way of still another example of the lever assembly, the lever assembly 2000 comprises the following: a first lever 2100 centrally located in the lever assembly; a pair of second levers rotatably connected to longitudinal outer ends of the first lever respectively and having the finger at a longitudinal inner end; a pair of third levers rotatably connected to longitudinal outer ends of the second levers respectively and having the finger at a longitudinal inner end; and a pair of fourth levers rotatably connected to the longitudinal outer ends of the third levers respectively and having fingers at longitudinal both ends.

In the foregoing examples of the lever assembly, the first lever 2100 has two, longitudinally-extending inclined surfaces, which define a partial spoiler and are spaced apart, in one lateral surface. Alternatively, the first lever 2100 has a pair of inclined surfaces in both lateral surfaces at a longitudinal end portion and another pair of inclined surfaces in both lateral surfaces at an opposite longitudinal end portion. In the foregoing examples of the lever assembly, each of the second to fourth levers has one inclined surface in one lateral surface thereof or a pair of inclined surfaces in both lateral surfaces thereof.

The lever assembly 2000 of the wiper blade according to embodiments includes a connector seat 2500, which is configured such that a base part of the connector assembly 3000 is seated on and fixed to the connector seat. In one embodiment, the base part of the connector assembly 3000 is a bracket 3100 to which parts for fixing coupling units of wiper arms are attached. The connector seat 2500 is provided in the first lever 2100. The connector seat 2500 includes a seat surface 2510 on which the bracket 3100 is seated. The bracket 3100 includes a contact surface 3131, 3132, 3133 that is formed complementarily to the seat surface. In one embodiment, the seat surface 2510 of the connector seat has an elongated U shape, which is concave towards a bottom of the first lever 2100 when viewing the first lever 2100 from front. Thus, the connector seat 2500 can be positioned low in the first lever 2100 and the wiper blade 100 can have a total height that is low. Further, in one embodiment, the seat surface 2510 of the connector seat is positioned within the first lever 2100 when viewing the first lever 2100 from the top.

In one embodiment, the connector seat 2500 includes a stepped surface 2520 that is formed along a periphery of the seat surface 2510 and thus separates the connector seat 2500 from the first lever 2100. Further, the bracket 3100 includes a flange 3140 that is formed along a periphery of the contact surface 3131, 3132, 3133 of the bracket. The flange 3140 is formed complementarily to the stepped surface so as to fit on the stepped surface. Since the bracket 3100 is seated on the connector seat 2500 through engagement between the stepped surface and the flange, the bracket 3100 can be positioned to the connector seat 2500 with ease and accuracy.

The bracket 3100 can be positioned to the connector seat 2500 in such a way that one end of the bracket 3100 is inserted to one end of the connector seat 2500 corresponding to the one end of the bracket. In one embodiment, the connector seat 2500 includes an insertion slot 2531 at its one end and the bracket 3100 includes an insertion protrusion 3151, which is inserted to the insertion slot 2531. Further, after the one end of the bracket is inserted to the connector seat 2500, the bracket 3100 is rotated towards the connector seat 2500. Then, the bracket 3100 is fixed to the connector seat 2500 through snap engagement between the opposite end of the bracket 3100 or the portion of the bracket adjacent to the opposite end and the corresponding opposite end of the connector seat 2500 or the portion of the connector seat adjacent to the corresponding opposite end. In one embodiment, the connector seat 2500 includes a snap protrusion 2532, which protrudes in a width direction, at the vicinity of the opposite end and the bracket 3100 includes a snap slot 3152 which the snap protrusion 2532 snap-engages.

Further, in one embodiment, a distance between longitudinal inner ends of the stepped surface 2520 of the connector seat is less than a distance between a tip end of the insertion protrusion and an edge of the flange located opposite the insertion protrusion. Thus, the bracket 3100 can be positioned to the connector seat in such a way of only inserting the insertion protrusion to the insertion slot. In contrast, the bracket 3100 is not allowed to be seated on the connector seat 2500 through such a way of coupling the opposite end of the bracket 3100, which is located opposite the insertion protrusion, to the opposite end of the connector seat 2500, which is located opposite the insertion slot. Thus, the bracket can be easily positioned to the connector seat.

Further, in one embodiment, the bracket 3100 includes an ear portion 3144. A portion of the flange 3140, which corresponds to the snap slot, protrudes outwardly, thus forming the ear portion 3144. The ear portion defines the seat position of the bracket 3100 relative to the connector seat 2500 and therefore may be used for easy detachment of the bracket 3100.

Referring to FIGS. 1 to 36, a wiper blade 100 according to an embodiment includes a wiper rubber assembly 1000, a lever assembly 2000 and a connector assembly 3000. The wiper rubber assembly 1000 includes a wiper rubber. The lever assembly 2000 holds and supports the wiper rubber assembly 1000. The connector assembly 3000 is detachably joined to the lever assembly 2000 and is used for connection to wiper arms.

The wiper rubber assembly 1000 includes a wiper strip or wiper rubber 1100, which is placed on the surface of a windshield of a motor vehicle, and spring rails 1200, which are fitted to the wiper rubber 1100 and impart rigidity to the wiper rubber 1100.

Figure 6:
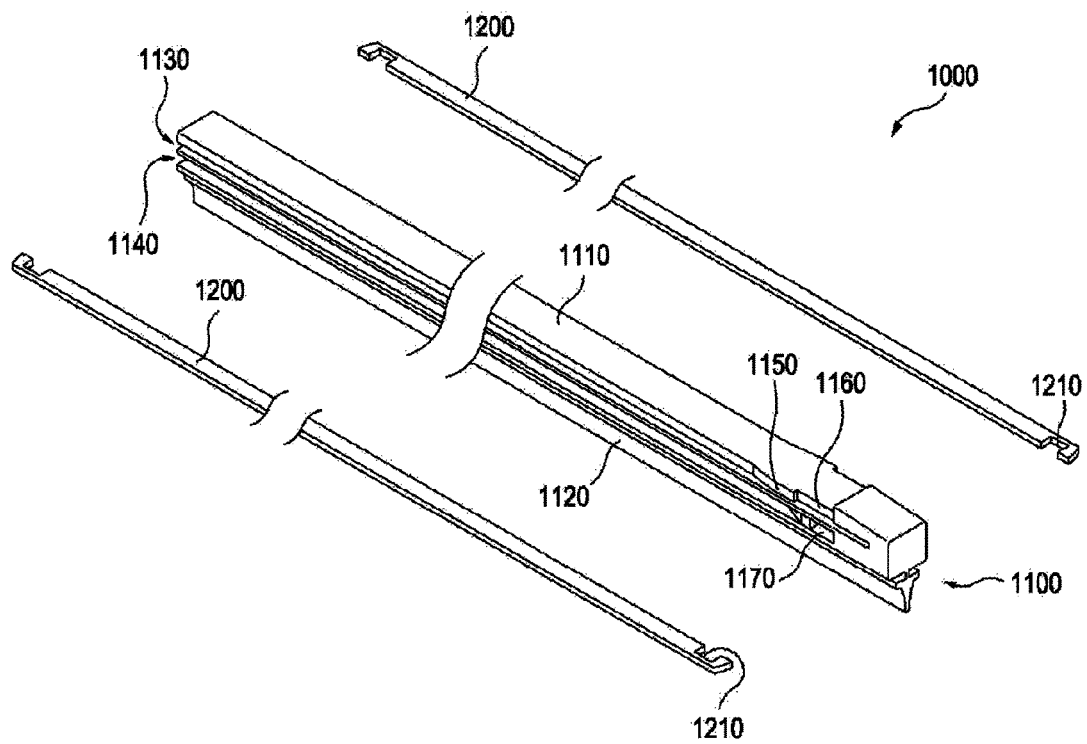
FIG. 6 is a perspective view showing a wiper rubber and spring rails constituting a wiper rubber assembly of the wiper blade according to an embodiment.
Figure 7:
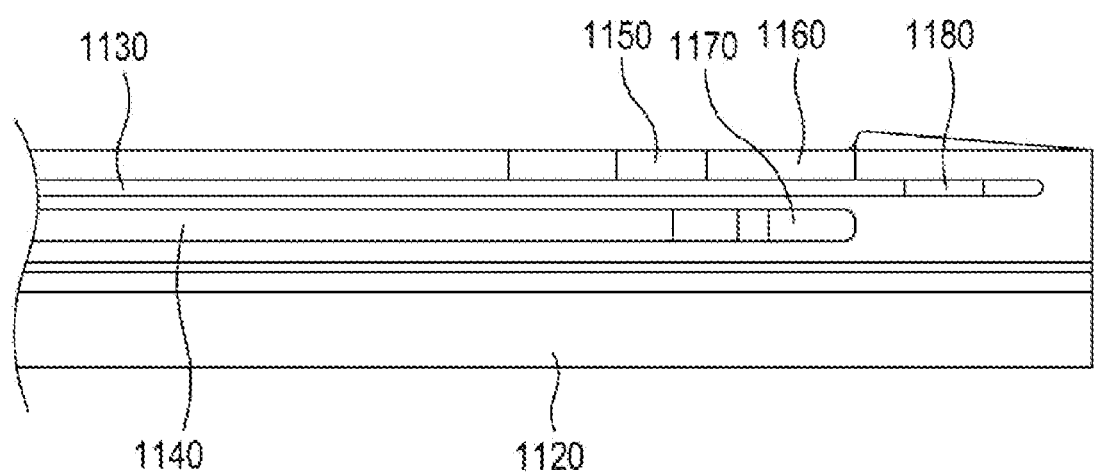
FIG. 7 is a fragmental front view of the wiper rubber shown in FIG. 6.
Figure 8:
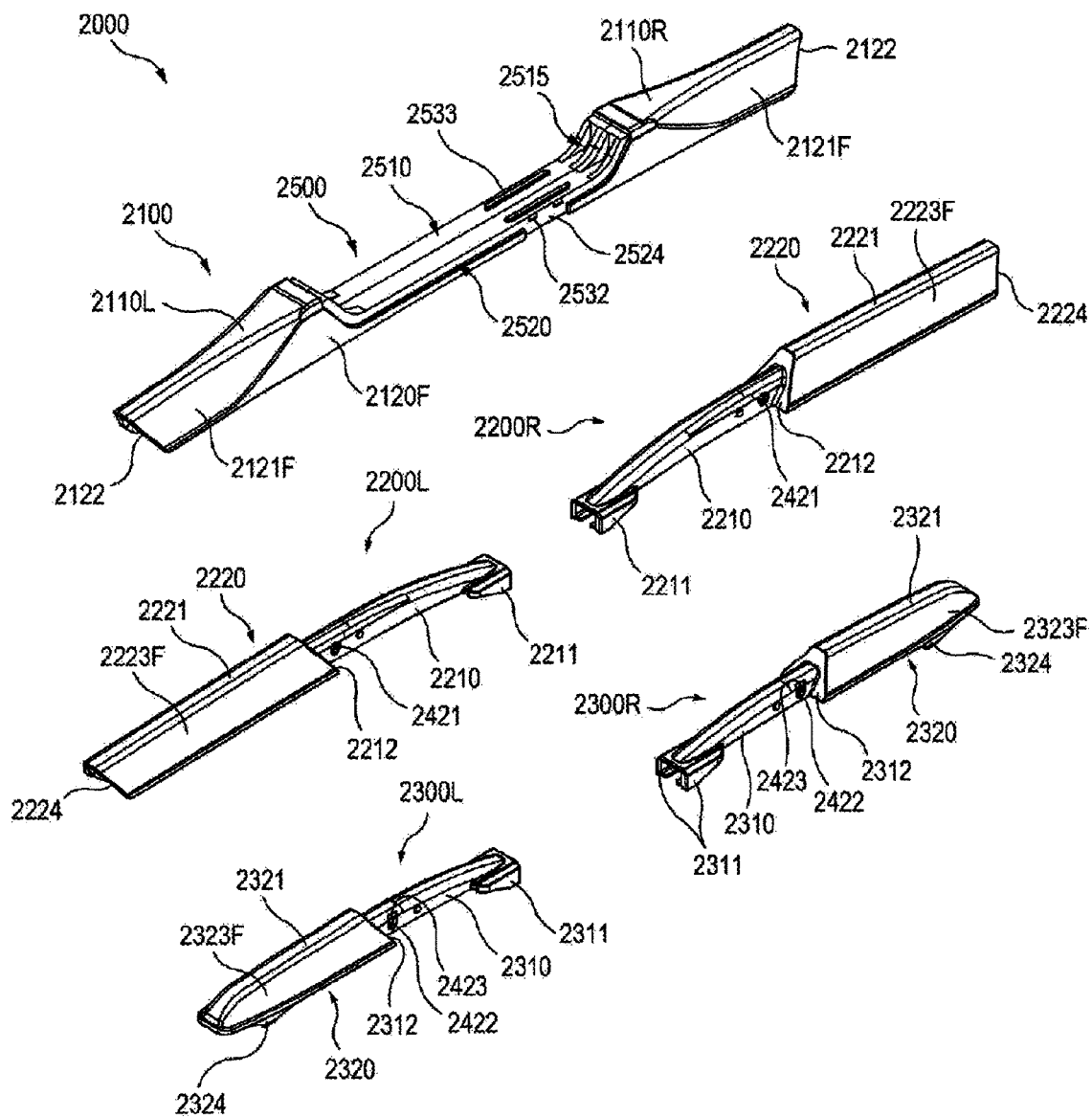
FIG. 8 is an exploded perspective view of a lever assembly of the wiper blade according to an embodiment.
Figure 9:
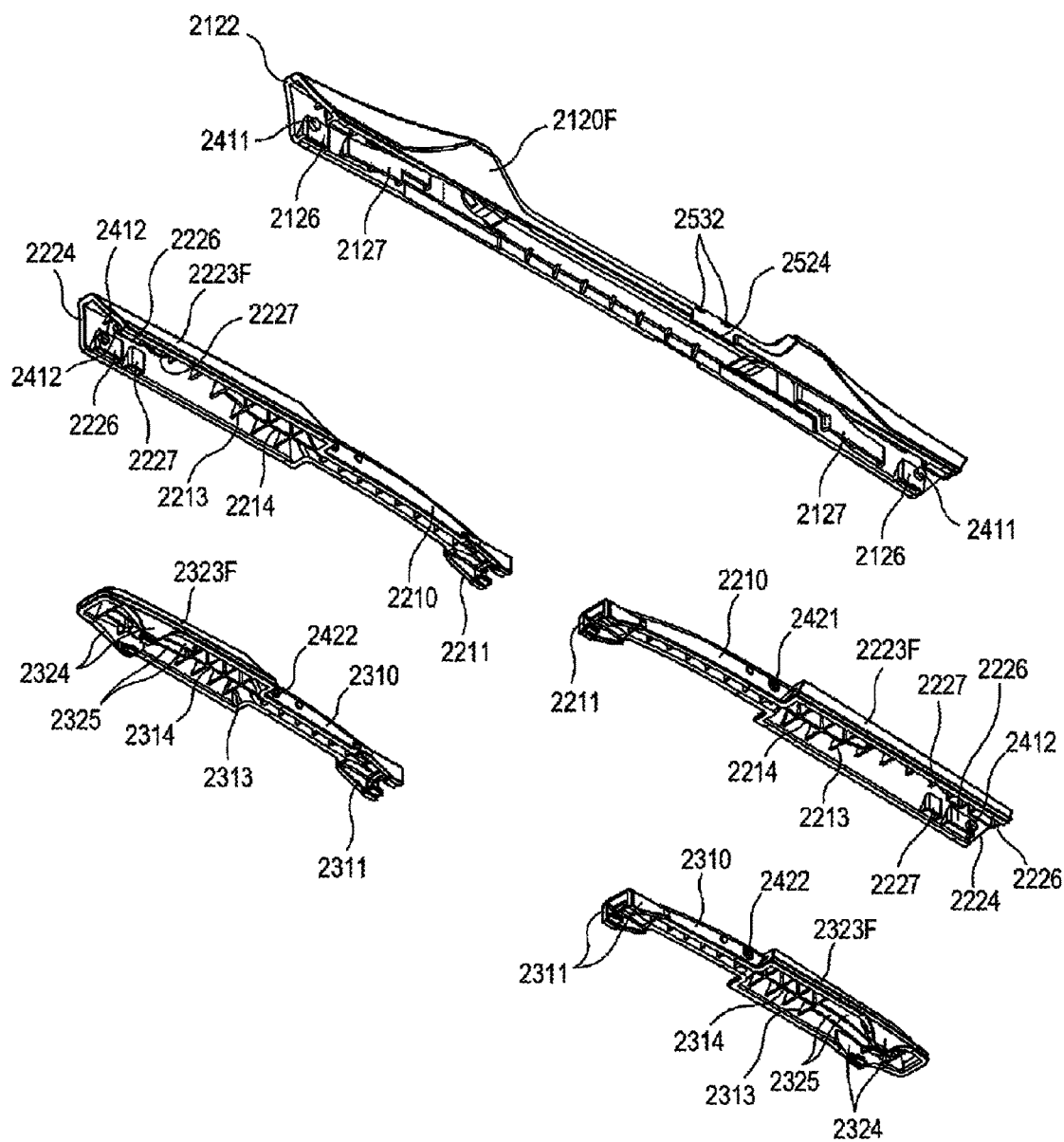
FIG. 9 is a lower perspective view of the lever assembly shown in FIG. 8.
Figure 10:
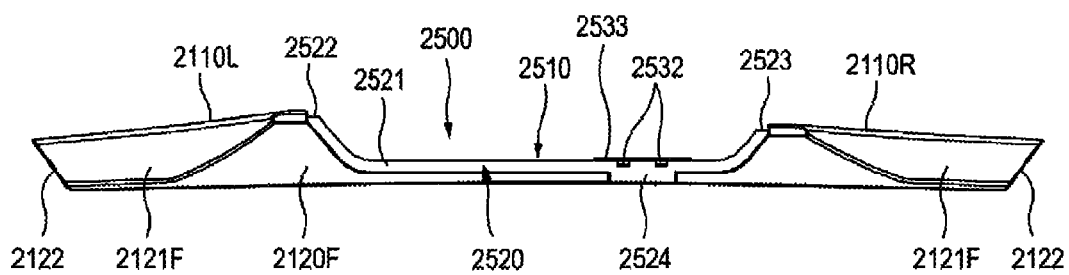
FIG. 10 is a front view of a first lever of the lever assembly shown in FIG. 8.
Figure 11:
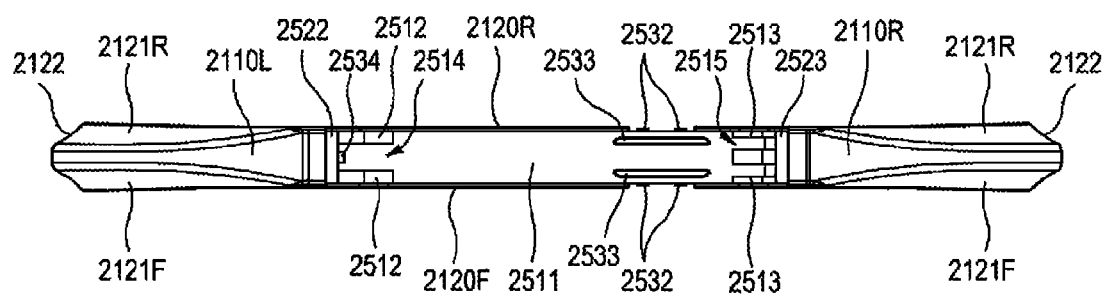
FIG. 11 is a top view of the first lever of the lever assembly shown in FIG. 8.
Figure 12:
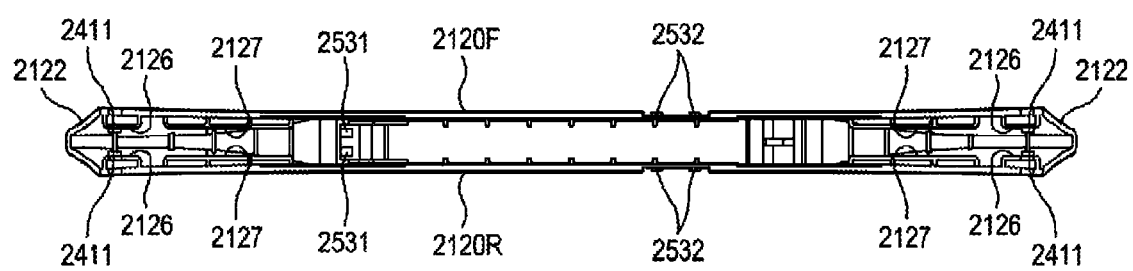
FIG. 12 is a bottom view of the first lever of the lever assembly shown in FIG. 8.
Figure 13:
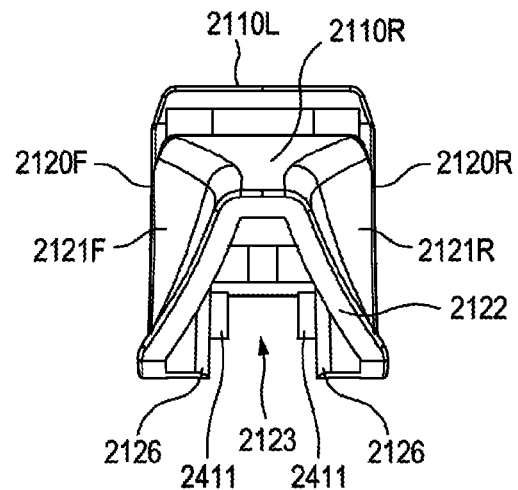
FIG. 13 is a right side view of the first lever of the lever assembly shown in FIG. 8.
Figure 14:
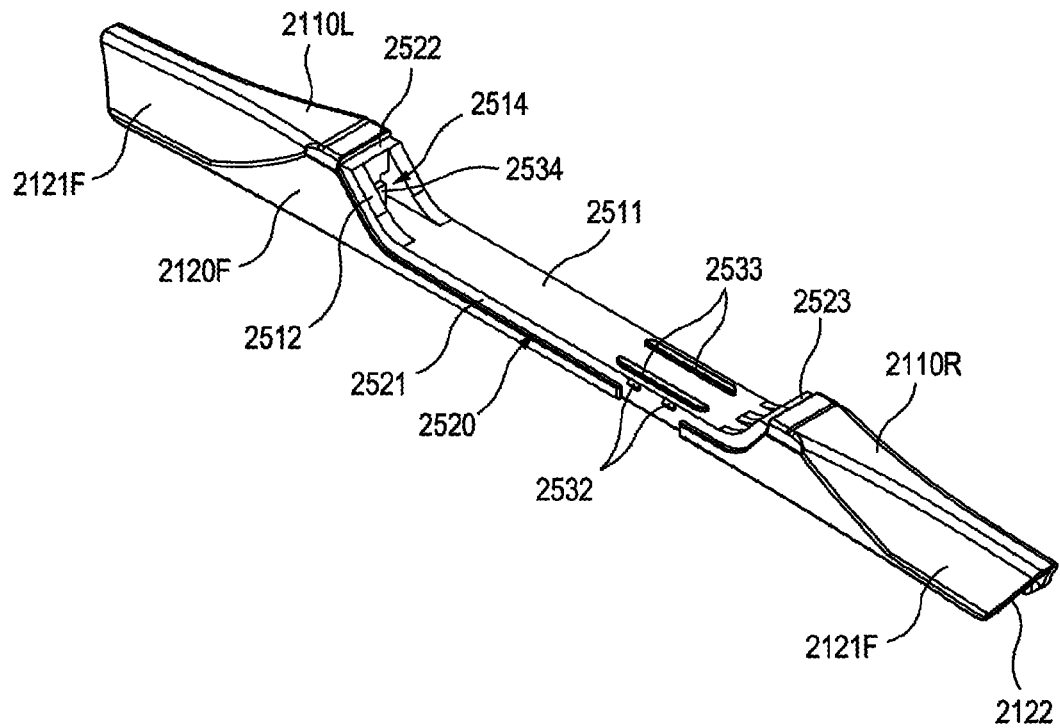
FIG. 14 is a perspective view of the first lever of the lever assembly shown in FIG. 8.
Figure 15:
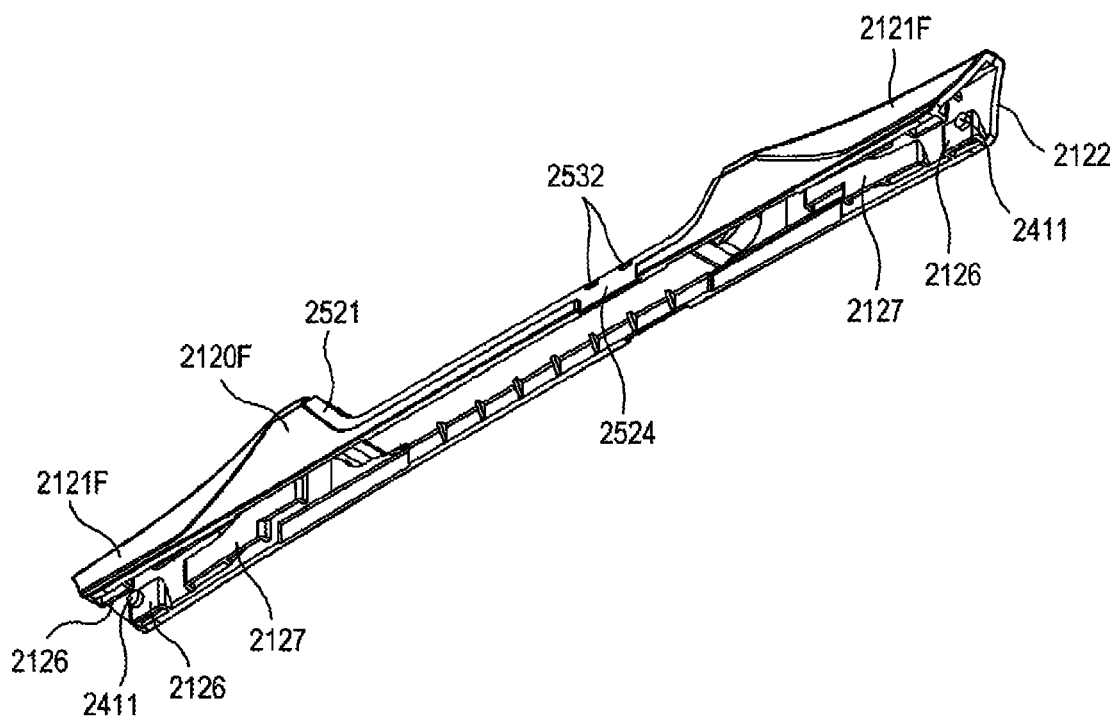
FIG. 15 is a lower perspective view of the first lever of the lever assembly shown in FIG. 8.
Figure 16:
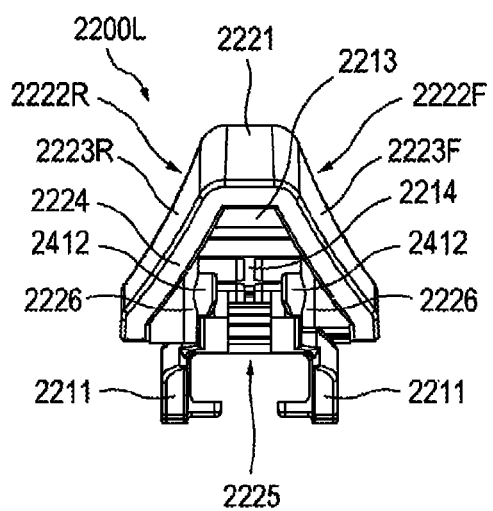
FIG. 16 is a left side view of a second lever of the lever assembly shown in FIG. 8.
Figure 17:
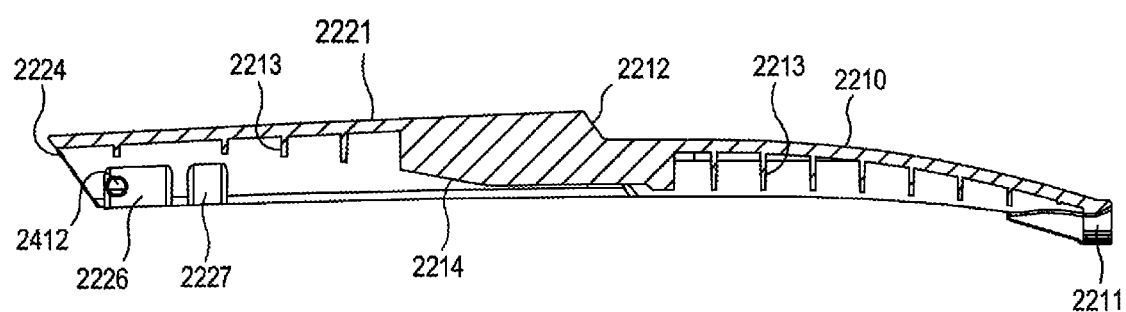
FIG. 17 is a longitudinal sectional view of a second lever of the lever assembly shown in FIG. 8.
Figure 18:
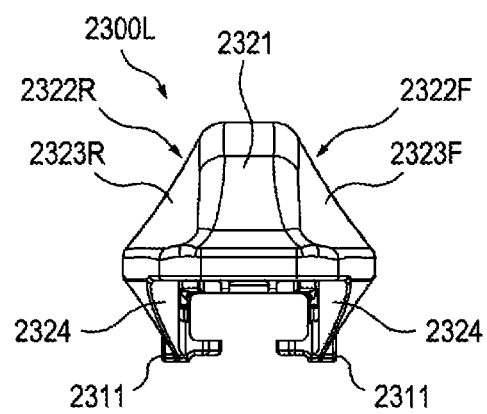
FIG. 18 is a left side view of a third lever of the lever assembly shown in FIG. 8.
Figure 19:
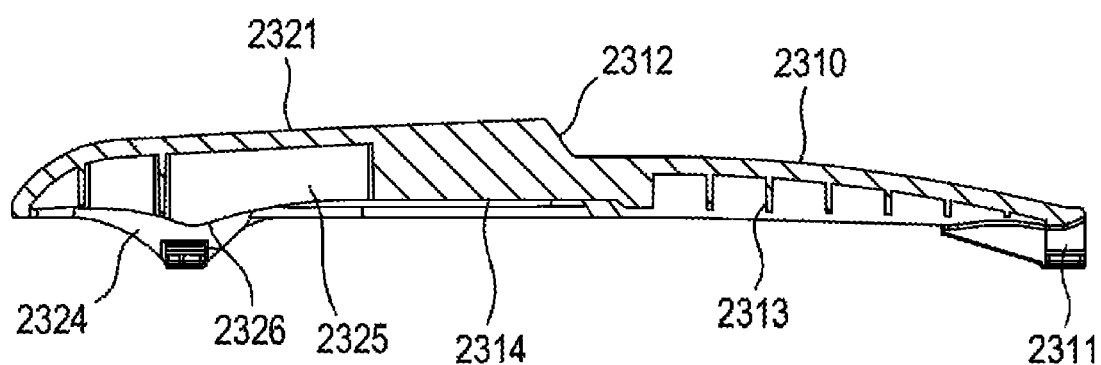
FIG. 19 is a longitudinal sectional view of the third lever of the lever assembly shown in FIG. 8.

The wiper rubber 1100 is made from a rubber or plastic material having elasticity. Referring to FIGS. 6 and 7, the wiper rubber 1100 has an elongated body portion 1110 and a wiper lip 1120 longitudinally extending under the body portion 1110 and contacting the windshield surface. Further, the wiper rubber 1100 has, at either side of the body portion 1110, two rows of grooves 1130, 1140 that extend in the longitudinal direction of the wiper rubber. A first groove 1130 extends along the body portion 1110 immediately below a top surface of the body portion 1110. A second groove 1140 extends along the body portion 1110 below the first groove 1130. The spring rails 1200 are inserted to the first grooves 1130 respectively. Fingers provided in the levers of the lever assembly 2000 are inserted to the second grooves 1140. In the vicinity of one end of the wiper rubber 1100, stoppers 1150 protrude between the top surface of the body portion 1110 and the first grooves 1130 and recesses 1160 are defined in edges of the top surface of the body portion 1110 due to the stoppers 1150. Further, insertion holes 1170, to which the tip ends of the outermost fingers among the fingers provided in the levers of the lever assembly 2000 are fitted, are formed below the recesses 1160 in the second grooves 1140 in the vicinity of one end of the second groove 1140. When the wiper rubber assembly 1000 and the lever assembly 2000 are assembled together, the tip ends of the outermost fingers are fitted to the insertion holes 1170 and the tip ends of other fingers are inserted to the second grooves 1140. Thus, the wiper rubber assembly 1000 is held by the lever assembly 2000.

The spring rails 1200 (referred to as a "vertebra" in the art) are fitted to the first grooves 1130 of the wiper rubber 1100 respectively. The spring rails 1200 distribute the pressure, which a wiper arm applies along the lever assembly 2000, along the longitudinal direction of the wiper rubber 1100. The spring rails 1200 are made from a metallic material and have a shape of a thin elongated bar. The spring rail 1200 has a notch 1210 at either end and the first groove 1130 has a protrusion 1180 corresponding to the notch 1210 therein. Some embodiments may include the spring rails 1200 that are inlaid or embedded to the body portion 1110 of the wiper rubber 1100 in the longitudinal direction.

The lever assembly 2000 holds the wiper rubber assembly 1000 (i.e., the wiper rubber 1100 with the spring rails 1200 fitted thereto) and supports the wiper rubber assembly 1000 with respect to the wiper arm. The wiper arm is connected to a rotating shaft of a wiper motor at its base end and is oscillated through the operation of the wiper motor. The wiper blade 100 is detachably attached to the distal end of the wiper arm via the connector assembly 3000, which is detachably mounted to the lever assembly 2000, and is thus connected to the wiper arm. The wiper blade 100 wipes the surface of the windshield while sliding on the surface of the windshield through oscillation motions of the wiper arm.

In this embodiment, the lever assembly 2000 includes the following: a first lever 2100 located centrally in the longitudinal direction; a pair of second levers 2200L, 2200R connected to the longitudinal outer ends of the first lever 2100 respectively; and a pair of third levers 2300L, 2300R connected to the second levers 2200L, 2200R respectively. The connector assembly 3000 for connection to the wiper arm is detachably joined to the first lever 2100. The first to third levers are formed in a linear shape and are adjoined linearly along the longitudinal direction of the wiper rubber 1100. The first to third levers have an elongated hollow shape and may be made by pressing a metallic sheet or injection-molding a plastic material. Adjacent two levers are rotatably connected to each other such that opposing end surfaces of said two levers face to each other with little gap therebetween.

When viewing the lever assembly 2000 from the top, a width of the lever assembly 2000 increases from the middle of the first lever 2100 towards the longitudinal outer ends of the first lever 2100. Further, when viewing the lever assembly 2000 from the front, the width of the lever assembly 2000 is constant in some section of the second levers 2200L, 2200R and the third levers 2300L, 2300R and decreases towards the longitudinal outer ends of the third levers 2300L, 2300R. When viewing the lever assembly 2000 from the top, front and rear halves of the lever assembly 2000 are symmetrical about a central axis of the longitudinal direction of the lever assembly. When viewing the lever assembly 2000 from the front, left and right halves of the lever assembly 2000 are symmetrical about a longitudinal center of the lever assembly except a top wall of the first lever 2100.

The lever assembly 2000 of the wiper blade 100 according to this embodiment includes a pair of spoilers 2600L, 2600R, which are integrated with the lever assembly. In this embodiment, as shown in FIGS. 4, 13, 16 and 18, the cross-sectional contour shape of the spoiler 2600L, 2600R includes a pair of concave curved lines that are symmetrical in the width direction of the lever assembly 2000. Each spoiler 2600L, 2600R comprises partial spoilers located in the first lever 2100, the second levers 2200L, 2200R and the third levers 2300L, 2300R. The partial spoilers of each lever are adjoined linearly one after another, thereby defining the spoiler 2600L, 2600R of the wiper blade 100. In the disclosure below discussing the wiper blade 100 according to the embodiment, a partial spoiler integrated in the first lever 2100 to become a part of the spoiler 2600L, 2600R is referred to as a first partial spoiler 2610L, 2610R, a partial spoiler integrated in the second lever 2200L, 2200R to become another part of the spoiler 2600L, 2600R is referred to as a second partial spoiler 2620L, 2620R, and a partial spoiler integrated in the third lever 2300L, 2300R to become yet another part of the spoiler 2600L, 2600R is referred to as a third partial spoiler 2630L, 2630R.

Referring to FIGS. 8 to 15, the first lever 2100 has a top wall 2110L, 2110R and a pair of lateral walls 2120F, 2120R. Further, a connector seat 2500 for seating the connector assembly 3000 is disposed in the middle of the first lever 2100. When viewing the first lever 2100 from the front, a bottom edge of the first lever 2100 is linear or upwardly convex with a slight curvature. Further, when viewing the first lever 2100 from the front, the height of the lateral wall 2120F, 2120R decreases from longitudinal ends of the connector seat 2500 towards the longitudinal outer ends of the first lever 2100. The end of the connector seat 2500 adjacent to the top wall 2110L is higher than the opposite end of the connector seat 2500 adjacent to the top wall 2110R. Further, when viewing the first lever 2100 from the top or the bottom, the midway width of the first lever 2100 is narrower than the width of the longitudinal outer ends. In another example of the first lever 2100, the height of the end of the connector seat 2500 adjacent to the top wall 2110L and the height of the opposite end of the connector seat 2500 adjacent to the top wall 2110R are the same. Further, the midway width the first lever 2100 is the same as or broader than the width of the longitudinal outer ends.

The first lever 2100 has a pair of first inclined surfaces 2121F, 2121R in the left lateral walls and the right lateral walls. The first inclined surfaces 2121F, 2121R extend from the vicinity of the longitudinal end of the connector seat 2500 up to the longitudinal outer end of the first lever 2100 and are inclined inwardly of the first lever 2100 in the width direction of the first lever 2100. Thus, when viewing the first lever 2100 from the side, the lateral walls of the first lever 2100 have an inverted V-shaped cross-section. The first partial spoiler 2610L, 2610R is integrated in the first lever 2100 through the first inclined surfaces 2121F, 2121R. The width of the top wall 2110L, 2110R becomes sharply narrow from the connector seat 2500 and is then constant. The first inclined surfaces 2121F, 2121R are concave in harmony with such a width of the top wall 2110L, 2110R. Thus, the cross-sectional contour shape of the first partial spoiler 2610L, 2610R, which the first inclined surfaces 2121F, 2121R define, includes a pair of concave curved lines that are symmetrical in the width direction of the first lever 2100.

The first lever 2100 has an arm receiving portion 2123 that receives a portion of the second lever 2200L, 2200R and hides the same therein. The arm receiving portion 2123 is defined by a space between the first inclined surfaces 2121F, 2121R. An end surface 2122 is formed at either longitudinal outer end of the first lever 2100. When viewing the first lever 2100 from the front, the end surface 2122 is inclined at an acute angle with respect to the top edge of the first lever and at an obtuse angle with respect to the bottom edge of the first lever, i.e., towards the longitudinal outer end of the lever assembly 2000 (towards a longitudinal outer end of the third lever 2300L, 2300R).

The connector seat 2500 is integrally provided in the first lever 2100 between the pair of the first inclined surfaces 2121F, 2121R located left in the first lever 2100 and the pair of the first inclined surfaces 2121F, 2121R located right in the first lever 2100. The connector seat 2500 is configured such that a bracket 3100 constituting the base of the connector assembly is seated on the connector seat and is fixed to the connector seat. The connector seat 2500 includes a seat surface 2510, on which the bracket 3100 is seated. Further, the connector seat 2500 includes a stepped surface 2520 separating the seat surface 2510 from the first lever 2100. The stepped surface 2520 is formed along the periphery of the seat surface 2510. Thus, due to the stepped surface 2520, the seat surface 2510 is located lower than the top walls 2110L, 2110R of the first lever and more inward than the lateral walls 2120F, 2120R of the first lever. Accordingly, the bracket 3100 of the connector assembly 3000 is coupled to the first lever 2100 in such a way that the bracket 3100 is seated on the seat surface 2510 and is positioned and retained by the stepped surface 2520.

In this embodiment, the seat surface 2510 of the connector seat is so shaped that the seat surface is sunken from the top wall 2110L, 2110R towards the lateral wall 2120F, 2120R at a certain depth. When viewing the first lever 2100 from the front, the seat surface 2510 has an elongated U shape. The stepped surface 2520 extends along the periphery of the seat surface 2510. Thus, the seat surface 2510 is separated from the top wall 2110L, 2110R and the lateral walls 2120F, 2120R via the stepped surface 2520.

The seat surface 2510 comprises a longitudinally-extending flat surface 2511 and first and second inclined surfaces 2512, 2513 extending from longitudinal ends of the flat surface 2511 respectively. The flat surface 2511 is located lower than the top edge of the first lever 2100 (the top wall 2110L 2110R). The first inclined surface 2512 and the second inclined surface 2513 are inclined at the same angle towards the longitudinal outer end of the first lever 2100 relative to the flat surface 2511.

The stepped surface 2520 comprises: a lateral stepped surface 2521, which extends alongside the flat surface 2511 and the first and second inclined surfaces 2512, 2513 and adjoins lateral edges of the flat surface 2511 and the first and second inclined surfaces 2512, 2513; and a first top stepped surface 2522 and a second top stepped surface 2523, which extends alongside top ends of the first and second inclined surfaces 2512, 2513 and adjoin the top ends of the first and second inclined surfaces 2512, 2513 respectively. When viewing the first lever 2100 from the front, the lateral stepped surface 2521 has an elongated U shape. The first and second top stepped surfaces 2522, 2523 are located at a certain depth below apex points of the top walls 2100L, 2110R of the first lever and the lateral stepped surface 2521 is located at a certain depth more inward than the lateral walls 2120F, 2120R of the first lever. Further, the connector seat 2500 includes an auxiliary stepped surface 2524 continued to the stepped surface 2520. The auxiliary stepped surface 2524 is formed adjacent to the second inclined surface 2513 between the lateral stepped surface 2521 and the bottom edge of the lateral wall 2120F, 2120R. Thus, the lateral wall 2120F, 2120R has a reduced thickness at the auxiliary stepped surface 2524.

The connector seat 2500 has recesses in the first and second inclined surfaces 2512, 2513 of the seat surface. Portions of the bracket are inserted to the recesses. The recesses are approximately L-shaped when viewing the first lever 2100 from the front. A first recess 2514, which is concave towards the longitudinal outer end of the first lever 2100, is formed in the first inclined surface 2512 and a pair of second recesses 2515, which are concave towards the longitudinal outer end of the first lever 2100, are formed in the second inclined surface 2513.

The connector seat 2500 includes a pair of insertion slots 2531 in the first recess 2514, which is located at the longitudinal outer end of the seat surface 2510. Insertion protrusions provided in the bracket 3100 are fitted to the insertion slots 2531. As to the stepped surface 2520, the first top stepped surface 2522 adjacent to the insertion slots 2531 is higher than the second top stepped surface 2523 located opposite the insertion slots 2531. Further, the connector seat 2500 includes a pair of snap protrusions 2532 at lateral edges of the flat surface 2511 of the seat surface. In this embodiment, the connector seat 2500 includes two pairs of snap protrusions 2532 and each snap protrusion in each pair is located in each lateral edge of the flat surface 2511. The snap protrusions 2532 are apart from the insertion slots 2531 and are located on the lateral stepped surface 2521 adjacent to the flat surface 2511. The snap protrusions 2532 are located above the auxiliary stepped surface 2524 and protrude in the width direction orthogonal to the longitudinal direction of the seat surface 2510. The snap protrusions 2532 snap-engage corresponding snap slots of the bracket 3100 of the connector assembly 3000, thereby fixing the connector assembly 3000 to the connector seat 2500. Further, the connector seat 2500 includes a pair of positioning ridges 2533 protruding on the flat surface 2511 of the seat surface. The positioning ridges 2533 are formed parallel to the auxiliary stepped surface 2524 and are fitted to positioning slots of the bracket 3100 of the connector assembly 3000. Further, the connector seat 2500 includes an insertion protrusion 2534 protruding between the pair of insertion slots 2531. The insertion protrusion 2534 is inserted into between the insertion protrusions of the bracket 3100 of the connector assembly 3000.

The second levers 2200L, 2200R are rotatably connected to the first lever 2100 respectively and holds the wiper rubber assembly 1000. Descriptions are made as to the second lever 2200L with reference to FIGS. 8, 9, 16 and 17.

The second lever 2200L, 2200R includes an arm portion 2210 and a spoiler portion 2220. When the first lever 2100 and the second lever 2200L, 2200R are assembled together, the arm portion 2210 is situated in the arm receiving portion 2123 of the first lever 2100. The spoiler portion 2220 extends from a longitudinal outer end of the arm portion 2210 towards the longitudinal outer end of the lever assembly 2000. The arm portion 2210 has an inverted U-shaped cross-section and the spoiler portion 2220 has an inverted V-shaped cross-section. Bottom edges of the arm portion 2210 and the spoiler portion 2220 form an approximately straight line or a concave curved line with slight curvature.

A stepped surface 2212, which is opposite the end surface 2122 of the first lever 2100, is formed at the boundary of the arm portion 2210 and the spoiler portion 2220. The stepped surface 2212 is inclined towards the longitudinal outer end of the lever assembly 2000 (the longitudinal outer end of the third lever 2300L, 2300R) at the same angle as the inclination angle of the end surface 2122 of the first lever 2100 or at an angle less than that. Further, the second lever 2200L, 2200R has an end surface 2224 at the longitudinal outer end thereof, i.e., the longitudinal outer end of the spoiler portion 2220. The end surface 2224 of the second lever 2200L, 2200R is inclined towards the longitudinal outer end of the lever assembly 2000 (the longitudinal outer end of the third lever 2300L, 2300R) at the same angle as the inclination angle of the end surface 2122 of the first lever or at an angle less than that.

Each second lever 2200L, 2200R has, at the longitudinal outer end of the arm portion 2210, a pair of fingers 2211 for grasping the wiper rubber assembly 1000. When viewing the second lever 2200L, 2200R from the side, the finger 2211 has an L shape. When assembling the second lever 2200L, 2200R and the wiper rubber assembly 1000, the tip ends of the fingers 2211 are inserted to the second grooves 1140 of the wiper rubber 1100 along the second grooves 1140. When the fingers 2211 are fitted to the wiper rubber 1100, the spring rail 1200 and a portion of the wiper rubber 1100 adjacent thereto are sandwiched between the fingers 2211 and the under surface of the arm portion 2210 located above the fingers 2211.

The spoiler portion 2220 has a top wall 2221 and a pair of lateral walls 2222F, 2222R. The spoiler portion 2220 has a pair of second inclined surfaces 2223F, 2223R in the lateral walls thereof. The second inclined surface 2223F, 2223R extends from the stepped surface 2212 up to the longitudinal outer end of the spoiler portion 2220 (i.e., up to the end surface 2224) and is inclined inwardly of the spoiler portion 2220 in the width direction of the spoiler portion 2220. The second partial spoiler 2620L, 2620R is integrated in the spoiler portion 2220 through the second inclined surfaces 2223F, 2223R. The width of the top wall 2221 is constant from the longitudinal inner end (the stepped surface 2212) to the longitudinal outer end (the end surface 2224). The cross-sectional contour shape of the second partial spoiler 2620L, 2620R, which the second inclined surfaces 2223F, 2223R define, includes a pair of concave curved lines that are symmetrical in the width direction of the spoiler portion 2220 (in the width direction of the second lever 2200L, 2200R).

The spoiler portion 2220 has an arm receiving portion 2225 that receives a portion of the third lever 2300L, 2300R and hides the same therein. The arm receiving portion 2225 is defined by a space between the second inclined surfaces 2223F, 2223R. The second lever 2200L, 2200R has a plurality of transverse ribs 2213 and a longitudinal rib 2214 therein. The transverse ribs 2213 are oriented in the width direction. The longitudinal rib 2214 is oriented in the longitudinal direction and intersects the transverse ribs 2213. The transverse ribs 2213 and the longitudinal rib 2214 are located in the arm portion 2210 as well as the spoiler portion 2220. Further, the transverse ribs 2213 and the longitudinal rib 2214 protrude such that they do not interfere with a portion of the third lever 2300L, 2300R.

The first lever 2100 and the second lever 2200L, 2200R are rotatably connected to each other through hinge-connection between the inside of the lateral walls 2120F, 2120R of the first lever and the outside of the arm portion 2210 of the second lever. When the first lever 2100 and the second lever 2200L, 2200R are connected, the arm portion 2210 of the second lever is situated in the arm receiving portion 2123 of the lateral walls 2120F, 2120R of the first lever 2100 and is thus hidden within the first lever 2100 when viewed from outside. In this embodiment, the hinge-connection portion configured to rotatably interconnect the first lever 2100 and the second levers 2200L, 2200R comprises: a pair of fitting protrusions 2411 disposed in the arm receiving portion 2123 of the first lever 2100; and a pair of fitting holes 2421, which are disposed in the arm portion 2210 of the second lever 2200L, 2200R, and to which the fitting protrusions 2411 are fitted respectively.

The first lever 2100 has, at the left and right thereof, two pairs of contact surfaces 2126, 2127 so that the second lever 2200L, 2200R hinge-joined to the first lever can be retained relative to the first lever 2100 without shake. The contact surfaces 2126, 2127 can contact the arm portion 2210 of the second lever in the width direction. The contact surfaces 2126, 2127 of each pair are located at the bottom edges of the inner surfaces of the lateral walls 2120F, 2120R. The contact surfaces 2126, 2127 of each pair are opposite each other and are raised inwardly of the first lever 2100. The fitting protrusion 2411 protrude from the contact surface 2126 inwardly of the first lever 2100 in the width direction of the first lever 2100. When the first lever 2100 and the second lever 2200L, 2200R are connected to each other, the arm portion 2210 is inserted into between the contact surfaces 2126, 2127 of each pair. Spacing between the contact surfaces 2126, 2127 of each pair is almost equal to or somewhat greater than the width of the arm portion 2210.

The fitting holes 2421 may be perforated through the lateral portions of the arm portion 2210 or be formed at a predetermined depth in the width direction of the second lever 2200L, 2200R. The fitting holes 2421 are located apart from the stepped surface 2212 of the second lever by the spacing between the end surface 2122 of the first lever and the fitting protrusion 2411.

The third levers 2300L, 2300R are rotatably connected to the second levers 2200L, 2200R respectively and hold the wiper rubber assembly 1000. Descriptions are made as to the third lever 2300L with reference to FIGS. 8, 9, 18 and 19. The third lever 2300L, 2300R includes an arm portion 2310 and a spoiler portion 2320. When the second lever 2200L, 2200R and the third lever 2300L, 2300R are assembled together, the arm portion 2310 is situated in the arm receiving portion 2225 of the second lever. The spoiler portion 2320 extends from a longitudinal outer end of the arm portion 2310 towards the longitudinal outer end of the lever assembly 2000. The arm portion 2310 has an inverted U-shaped cross-section and the spoiler portion 2320 has an inverted V-shaped cross-section. Bottom edges of the arm portion 2310 and the spoiler portion 2320 form an approximately straight line.

A stepped surface 2312, which is opposite the end surface 2224 of the second lever 2200L, 2200R, is formed at the boundary of the arm portion 2310 and the spoiler portion 2320. The stepped surface 2312 is inclined towards the longitudinal outer end of the lever assembly 2000 (the longitudinal outer end of the third lever 2300L, 2300R) at the same angle as the inclination angle of the end surface 2224 of the second lever or at an angle less than that.

Each third lever 2300L, 2300R has two pairs of fingers 2324, 2311 for grasping the wiper rubber assembly 1000. Longitudinal inner fingers 2311 are formed at a longitudinal inner end of the arm portion 2310. The fingers 2311 have the same configuration as the fingers 2211 of the second lever. Longitudinal outer fingers 2324 are formed at a bottom edge of the spoiler portion 2320 in the vicinity of a longitudinal outer end thereof. The fingers 2324 extend from the bottom edge of the spoiler portion 2320 in an L shape. When assembling the third lever 2300L, 2300R and the wiper rubber assembly 1000, the tip ends of the fingers 2311, 2324 are inserted to the second grooves 1140 of the wiper rubber 1100. A pair of longitudinally extending ribs 2325 are formed in the inside of the spoiler portion 2320 in which the fingers 2324 are provided. The portions of the ribs 2325, which are located above the tip ends of the fingers 2324 protrude downwardly to form a pressing portion 2326. When the lever assembly 2000 and the wiper rubber assembly 1000 are assembled together, the pressing portion 2326 presses the top surface of the body portion 1110 of the wiper rubber 1100 downwardly (towards the tip ends of the fingers 2324) or is placed on the top surface of the body portion 1110 of the wiper rubber 1100 with little gap. Thus, the fingers 2324 firmly clamp the wiper rubber 1100 by the pressing portion 2326.

The spoiler portion 2320 has a top wall 2321 and a pair of lateral walls 2322F, 2322R. The spoiler portion 2320 has a pair of third inclined surfaces 2323F, 2323R in the lateral walls thereof. The third inclined surface 2323F, 2323R extends from the stepped surface 2312 up to the longitudinal outer end of the spoiler portion 2320 and is inclined inwardly of the spoiler portion 2320 in the width direction of the spoiler portion 2320. The third partial spoiler 2630L, 2630R is integrated in the spoiler portion 2320 through the third inclined surfaces 2323F, 2323R. The width of the top wall 2321 is constant from the longitudinal inner end (the stepped surface 2312) up to the longitudinal outer end. The cross-sectional contour shape of the third partial spoiler 2630L, 2630R, which the third inclined surfaces 2323F, 2323R define, includes a pair of concave curved lines that are symmetrical in the width direction of the spoiler portion 2320 (in the width direction of the third lever 2300L, 2300R). Further, the height of the third inclined surfaces 2323F, 2323R decreases towards the longitudinal outer end of the third lever 2300L, 2300R. Further, the third inclined surfaces 2323F, 2323R may be curved with the same curvature as that of the second inclined surfaces 2223F, 2223R of the second lever 2200L, 2200R, or curved with a curvature varying therefrom. In this embodiment, the third inclined surfaces 2323F, 2323R of the third lever 2300L, 2300R are curved with the curvature greater than that of the second inclined surfaces 2223F, 2223R at the end surface 2224 of the second lever. Further, bottom edges of the third inclined surfaces 2323F, 2323R approach each other at the longitudinal outer end of the third lever 2300L, 2300R, thus forming a round outer end of the lever assembly 2000 together with the top wall 2310.

The third lever 2300L, 2300R has a plurality of transverse ribs 2313 and a longitudinal rib 2314 therein. The transverse ribs 2313 are oriented in the width direction. The longitudinal rib 2314 is oriented in the longitudinal direction and intersects the transverse ribs 2313. The transverse ribs 2313 and the longitudinal rib 2314 are located in the arm portion 2310 as well as the spoiler portion 2320.

The second lever 2200L, 2200R and the third lever 2300L, 2300R are rotatably connected to each other through hinge-connection between the inside of the lateral walls 2222F, 2222R of the second lever and the outside of the arm portion 2310 of the third lever. When the second lever 2200L, 2200R and the third lever 2300L, 2300R are connected, the arm portion 2310 of the third lever is situated in the arm receiving portion 2225, which is located in the lateral walls 2222F, 2222R of the second lever 2200L, 2200R, and is thus hidden within the second lever 2200L, 2200R when viewed from outside. In this embodiment, the hinge-connection portion configured to rotatably interconnect the second lever 2200L, 2200R and the third lever 2300L, 2300R comprises: a pair of fitting protrusions 2412 disposed in the arm receiving portion 2225 of the spoiler portion 2220 of the second lever; and a pair of fitting holes 2422, which are disposed in the arm portion 2310 of the third lever, and to which the fitting protrusions 2412 are fitted respectively.

The second lever 2200L, 2200R has two pairs of contact surfaces 2226, 2227 so that the third lever 2300L, 2300R hinge-joined to the second lever can be retained relative to the second lever 2200L, 2200R without shake. The contact surfaces 2226, 2227 can contact the arm portion 2310 of the third lever in the width direction. The contact surfaces 2226, 2227 of each pair are located opposite each other in the inner surface of the spoiler portion 2220 of the second lever and are raised inwardly of the second lever. The fitting protrusion 2412 protrude from the contact surface 2226 inwardly of the second lever in the width direction of the second lever. The fitting protrusions 2412 have a beveled surface at a lower portion of a tip end thereof to facilitate fitting to the fitting holes 2422. When the second 2200L, 2200R and the third lever 2300L, 2300R are connected to each other, the arm portion 2310 of the third lever is inserted or fitted into between the contact surfaces 2226, 2227 of each pair. Spacing between the contact surfaces 2226, 2227 of each pair is almost equal to or somewhat greater than the width of the arm portion 2310 of the third lever.

The fitting holes 2422 may be perforated through the lateral portions of the arm portion 2310 or be formed at a predetermined depth in the width direction of the third lever 2300L, 2300R. The fitting holes 2422 are apart from the stepped surface 2312 of the third lever by the spacing between the end surface 2224 of the second lever and the fitting protrusion 2412. Guide grooves 2423 for guiding the insertion of the fitting protrusions 2412 are formed from a top surface of the arm portion 2310 of the third lever to the fitting holes 2422 respectively.

Figure 20:
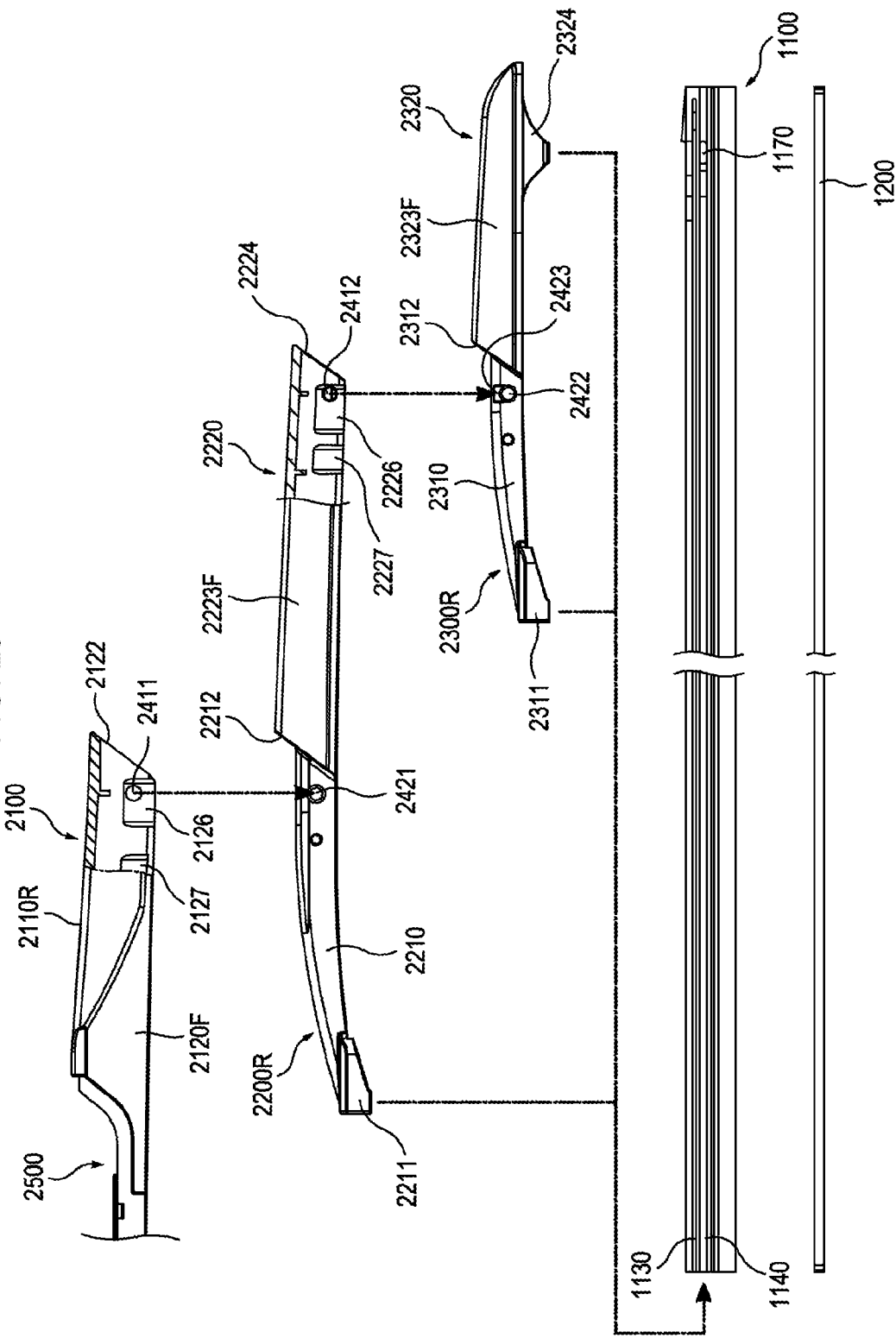
FIG. 20 shows an assembly example of the lever assembly.
Figure 21:
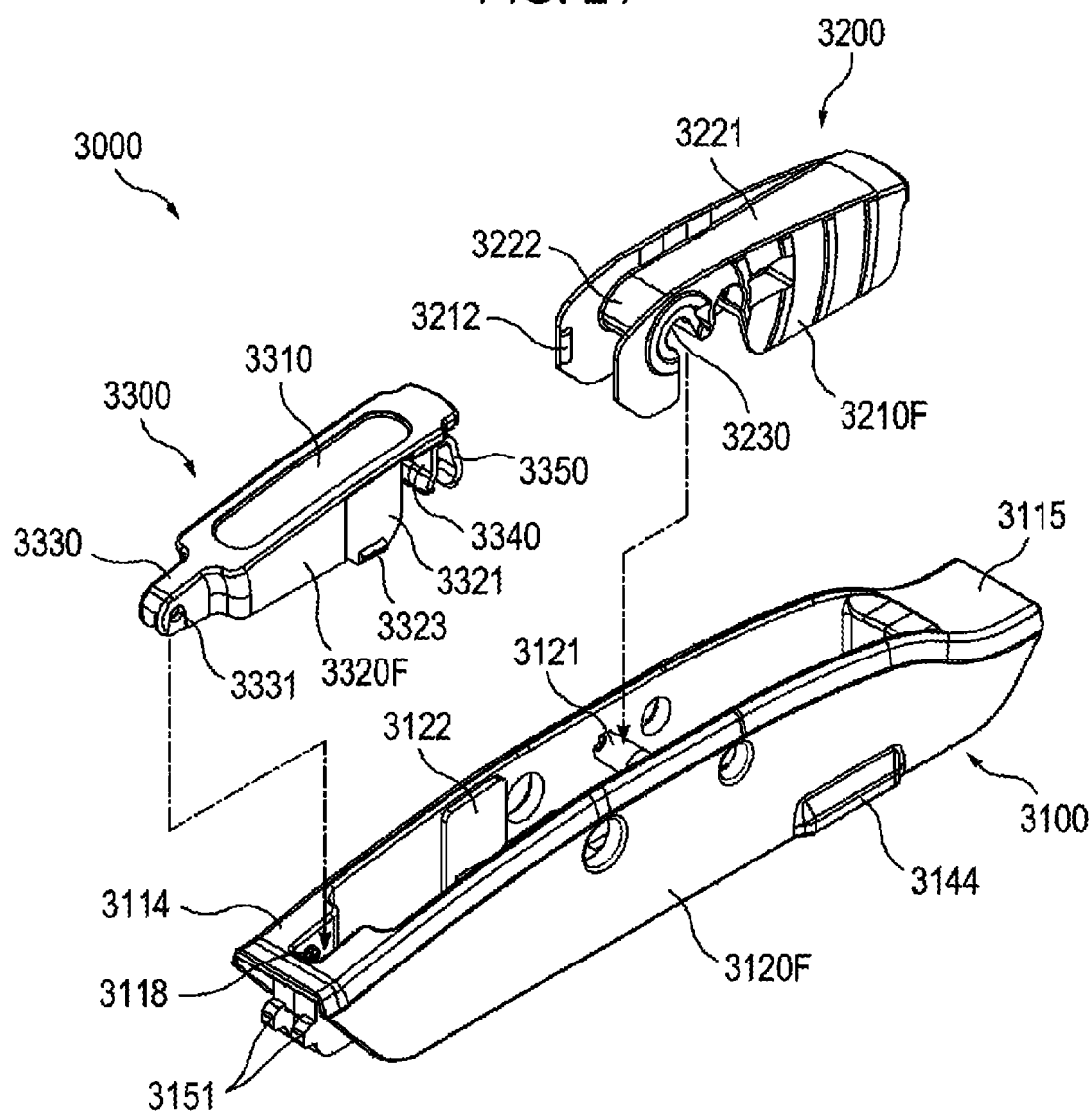
FIG. 21 is an exploded perspective view of a connector assembly of the wiper blade according to an embodiment.

Descriptions are made as to an assembly example of the lever assembly 2000 and an assembly example of the wiper rubber assembly 1000 and the lever assembly 2000 with reference to FIG. 20.

The end surface 2122 located at the longitudinal outer end of first lever 2100 and the stepped surface 2212 of the second lever 2200L, 2200R are approached to each other and one of the first and second levers is pressed towards the other of the first and second levers. Then, the fitting protrusions 2411 of the first lever 2100 enter the fitting holes 2421 of the arm portion 2210 of the second lever 2200R while pressing or pinching an upper portion of the arm portion 2210. Subsequently, the fitting protrusions 2411 are fitted to the fitting holes 2421 through snap-engagement manner, thereby hinge-joining the first lever 2100 and the second lever 2200R to each other. If the first lever 2100 and the second lever 2200R are connected to each other, a portion of the arm portion 2210 of the second lever adjacent to the fitting hole 2421 and another portion located further inward than said portion are sandwiched between the contact surfaces 2126 as well as between the contact surfaces 2127. The second lever 2200R and the third lever 2300R are connected to each other in the above-described manner. That is, the end surface 2224 of the second lever 2200R and the stepped surface 2312 of the third lever 2300R are approached to each other and one of the second and third levers is pressed towards the other of the second and third levers. Then, the fitting protrusions 2412 of the second lever 2200R are fitted to the fitting holes 2422 of the arm portion 2310 of the third lever 2300R through snap-engagement manner, thereby hinge-joining the second lever 2200R and the third lever 2300R to each other. Hinge-connection between the first lever 2100 and the second lever 2200L and hinge-connection between the second lever 2200L and the third lever 2300L are made in the same manner as the above-described manner.

By fitting the fingers 2324, 2311 of the third levers 2300L, 2300R and the fingers 2211 of the second levers 2200L, 2200R to the second groove 1140 of the wiper rubber 1100, the wiper rubber assembly 1000 and the lever assembly 2000 are assembled together. For example, the fingers 2324, 2311 of the third lever 2300R, the fingers 2211 of the second lever 2200R, the fingers 2211 of the second lever 2200L and the fingers 2311, 2324 of the third lever 2300L are inserted to the second grooves 1140 of the wiper rubber one after another while sliding the wiper rubber assembly 1000 along the lever assembly 2000. If the tip ends of the fingers 2324 of the third lever 2300R are fitted to the insertion holes 1170, then the wiper rubber assembly 1000 is fixed to the lever assembly 2000.

Referring again to FIGS. 1 to 3 showing the assembled wiper blade 100, the lever assembly 2000 holds and supports the wiper rubber assembly 1000 at six pressure points by means of the fingers 2324, 2311 and the fingers 2211. Further, the first lever 2100, the second levers 2200L, 2200R and the third levers 2300L, 2300R are arranged linearly along the longitudinal direction of the wiper rubber 1100 and are at the same height on the wiper rubber 1100. Further, in the assembled wiper blade 100, the first inclined surfaces 2121F, 2121R of the first lever, the second inclined surfaces 2223F, 2223R of the second lever and the third inclined surfaces 2323F, 2323R of the third lever are adjoined linearly one after another, thereby defining the spoiler 2600L, 2600R, which has the cross-sectional contour shape varying along the longitudinal direction of the lever assembly 2000 and has a decreasing height dimension. The end surface 2122 of the first lever 2100, the stepped surface 2122 and the end surface 2224 of the second lever 2200L, 2200R and the stepped surface 2312 of the third lever 2300L, 2300R are inclined towards the longitudinal outer end of the lever assembly 2000 at an acute angle relative to the top and bottom edges of the lever assembly 2000. Further, the end surface 2122 of the first lever 2100 and the stepped surface 2212 of the second lever 2200L, 2200R have a slight play therebetween and the end surface 2224 of the second lever 2200L, 2200R and the stepped surface 2312 of the third lever 2300L, 2300R have a slight play therebetween. The second lever 2200L, 2200R and the third lever 2300L, 2300R can rotate upwardly relative to the first lever 2100 to a little extent. In contrast, when a downward load acts on the wiper blade 100, the lever assembly 2000 can bring the wiper rubber assembly 1000 into strong contact with the windshield. Further, the stepped surface 2212 of the second lever is inclined at an angle less than the end surface 2122 of the first lever, and the stepped surface 2312 of the third lever is inclined at an angle less than the end surface 2224 of the second lever. Accordingly, when a downward load acts on the wiper blade 100, the lever assembly 2000 can transmit the pressing force, which is applied from the wiper arm, to the wiper rubber assembly 1000 at almost the same magnitude without decreasing towards the both ends of the wiper rubber assembly 1000.

In some embodiments, the fitting protrusions 2411, 2412 constituting the hinge-connection portion may be disposed in the arm portion 2210 of the second lever and the arm portion 2310 of the third lever and the fitting holes 2421, 2422 may be disposed in the arm receiving portion 2123 of the first lever and the arm receiving portion 2225 of the second lever. Further, wiper blades according to other embodiments may be configured to hold the wiper rubber assembly 1000 at four, eight or more pressure points by means of the above-described hinge-connection portion. For example, when the wiper rubber assembly 1000 is held at four pressure points, the lever assembly of the wiper blade 100 may comprise the first lever 2100 and a pair of the third levers 2300L, 2300R connected to the first lever by means of the above-described hinge-connection portion. Further, when the wiper rubber assembly 1000 is held at eight pressure points, the lever assembly of the wiper blade 100 may include an additional lever, which is shaped and configured similarly to the second lever 2200L, 2200R, between the first lever 2100 and the second lever 2200L, 2200R or between the second lever 2200L, 2200R and the third lever 2300L, 2300R.

Figure 37:
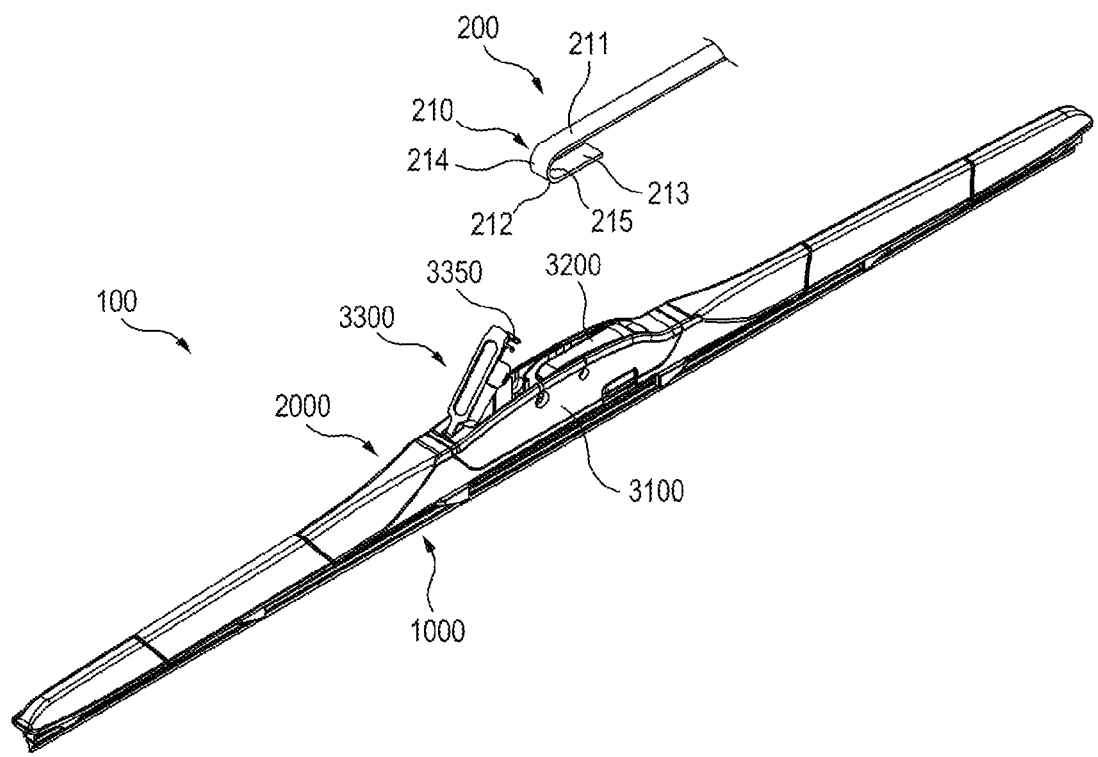
FIG. 37 shows a connection example between the wiper blade according to an embodiment and a hook portion of a hook wiper arm.
Figure 38:
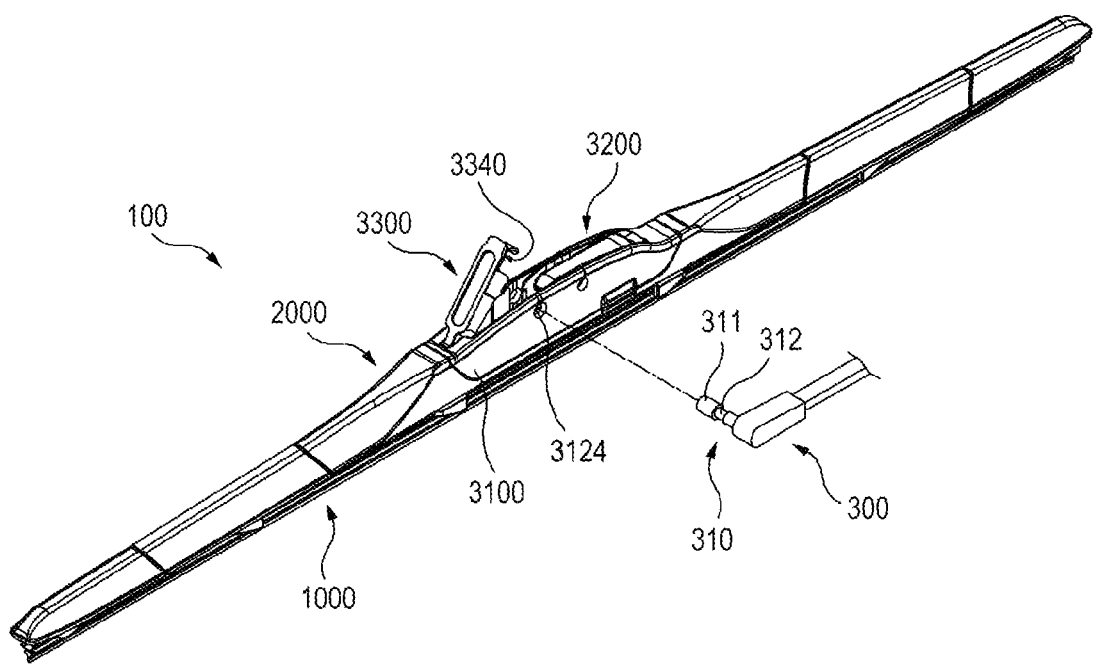
FIG. 38 shows a connection example between the wiper blade according to an embodiment and a pin portion of a side pin wiper arm.

The wiper blade 100 according to the embodiment that includes the above-described wiper rubber assembly 1000 and lever assembly 2000 is connected to wiper arms via the connector assembly 3000. Further, the wiper blade 100 according to the embodiment is applied to either a "hook wiper arm" including a hook-shaped coupling unit at its distal end or a "side pin wiper arm" including a pin-shaped coupling unit at its distal end. Referring to FIG. 37, the hook wiper arm 200, to which the wiper blade 100 according to the embodiment is connected, has a hook coupling unit 210 at its distal end. The hook coupling unit 210 includes a linear portion 211, a hook portion 212 extending from the linear portion 211 and being curved in an approximately semicircular shape, and an extension portion 213 extending rearward from the hook portion 212 parallel to the linear portion 211. The hook portion 212 has an outer surface 214 located outside in the semicircular shape and an inner surface 215 located inside in the semicircular shape. Referring to FIGS. 38 and 38, the side pin wiper arm 300, to which the wiper blade 100 according to the embodiment is connected, has a pin coupling unit 310, 320 at its distal end. The pin coupling unit 310 has a pin portion 311, which extends from the side pin wiper arm 300 approximately orthogonally thereto, and an annular groove 312 formed midway in the pin portion 311 in a circumferential direction of the pin portion 311. Further, the pin coupling unit 320 has a pin portion 321, which has a diameter smaller than that of the pin portion 311, and an annular groove 322 formed midway in the pin portion 321 in a circumferential direction of the pin portion 321.

Referring to FIGS. 1 to 5 and 21 to 36, the connector assembly 3000 is configured to connect the lever assembly 2000, which holds the wiper rubber assembly 1000, to one of the above-described hook coupling unit 210 and pin coupling unit 310, 320. In this embodiment, the connector assembly 3000 includes a bracket 3100, an adaptor 3200 and a rotation cover 3300. The bracket 3100 is detachably fixed to the connector seat 2500 provided in the first lever 2100 of the lever assembly 2000. The adaptor 3200 is located inside the bracket 3100 as rotatably coupled to a shaft part provided in the bracket 3100. The rotation cover 3300 is rotatably joined to the bracket 3100 and is located inside the bracket 3100 opposite the adaptor 3200. The adaptor 3200 supports the hook coupling unit 210 and fixes the pin coupling unit 320. The rotation cover 3300 fixes the hook coupling unit 210 or the pin coupling unit 310 to the bracket 3100 or the adaptor 3200.

Descriptions are made as to the bracket 3100 with reference to FIGS. 21 to 29. The bracket 3100 serves as a base of the connector assembly 3000. The adaptor 3200 and the rotation cover 3300 are attached to the bracket 3100. The bracket 3100 is coupled to the connector seat 2500 of the first lever 2100 in such a manner that a longitudinal end of the bracket 3100 is inserted to the longitudinal end of the connector seat 2500, and then the bracket is rotated about its longitudinal end and thereafter a longitudinal opposite end of the bracket or a portion of the bracket adjacent to the longitudinal opposite end of the bracket snap-engages the longitudinal opposite end of the connector seat 2500 or a portion of the connector seat adjacent to the longitudinal opposite end of the connector seat.

The bracket 3100 has a bottom wall 3110, which is seated on the seat surface 2510 of the connector seat 2500 and forms a bottom, and a pair of lateral walls 3120F, 3120R, which are located at respective lateral sides of the bottom wall 3110. The bottom wall 3110 has a flat portion 3111, which extends longitudinally, and a first inclined portion 3112 and a second inclined portion 3113, which are inclined at respective longitudinal outer ends of the flat portion 3111 with respect to the flat portion 3111. Further, the bottom wall 3110 has a first bent portion 3114, which extends from the longitudinal end of the flat portion 3111 in an L shape, and a second bent portion 3115, which extends in an L shape from the longitudinal opposite end of the flat portion 3111 located opposite the longitudinal end. A top surface of the second bent portion 3115 is curved downwardly concavely. The lateral walls 3120F, 3120R are integrated with the bottom wall 3110 at lateral edges of the flat portion 3111, the first inclined portion 3112, the first bent portion 3114, the second inclined portion 3113 and the second bent portion 3115. The space defined by the first bent portion 3114, the second bent portion 3115 and the lateral walls 3120F, 3120R accommodates the adaptor 3200 and the rotation cover 3300. When viewing the bracket 3100 from the front, top edges of the lateral walls 3120F, 3120R are curved in a circular arc shape and the top surface of the second bent portion 3115 is curved in a direction reverse to said circular arc shape. When the bracket 3100 is joined to the connector seat 2500, an end of the top surface of the first bent portion 3114 and the top wall 2110L of the first lever 2100, which faces to said end of the top surface of the first bent portion, are positioned approximately at the same level. Also, an end of the top surface of the second bent portion 3115 and the top wall 2110R of the first lever 2100, which faces to said end of the top surface of the second bent portion, are positioned approximately at the same level.

The bracket 3100 includes a contact surface 3131, 3132, 3133, which is formed complementarily to the seat surface 2510 of the connector seat 2500 and contacts the seat surface 2510. In this embodiment, said contact surface comprises a flat surface 3131, which forms the under surface of the flat portion 3111 of the bottom wall 3110, and inclined surfaces 3132, 3133, which forms the outer surfaces of the first and second inclined portions 3112, 3113. The flat surface 3131 of said contact surface directly contacts the flat surface 2511 of the seat surface 2510 of the connector seat 2500 and the inclined surfaces 3132, 3133 of said contact surface can contact the first and second inclined surfaces 2512, 2513 of the seat surface 2510 respectively. Further, the bracket 3100 includes a flange 3140, which is formed complementarily to the stepped surface 2520 of the connector seat and is formed along a periphery of the contact surface 3131, 3132, 3133. When the bracket 3100 is coupled to the connector seat 2500, the flange 3140 fits on the stepped surface 2520 or contacts a portion or the entirety of the stepped surface 2520. In this embodiment, the flange 3140 has the following: a lateral flange 3141 fitting on the lateral stepped surface 2521 of the stepped surface; a first top flange 3142 fitting on the first top stepped surface 2522 of the stepped surface; and a second top flange 3143 fitting on the second top stepped surface 2523 of the stepped surface. The lateral flange 3141 is formed along both lateral edges of the flat surface 3131 and both lateral edges of the inclined surfaces 3132, 3133 and protrudes to the extent of the protrusion height of the lateral stepped surface 2521. The first top flange 3142 is formed along the longitudinal outer end of the first bent portion 3114 and the second top flange 3143 is formed along the longitudinal outer end of the second bent portion 3115. The first and second top flanges 3142, 3143 protrude to the extent of the protruding distance of the first and second top stepped surfaces 2522, 2523.

The bracket 3100 is coupled to the connector seat 2500 of the lever assembly 2000 through insertion and then rotation. The bracket 3100 includes insertion protrusions 3151, which are inserted to the insertion slots 2531 of the connector seat 2500, and snap slots 3152 which the snap protrusions 2532 of the connector seat 2500 snap-engage. Further, the bracket 3100 includes positioning slots 3153 for positioning relative to the connector seat 2500.

The bottom wall 3110 has a first insertion portion 3154, which is inserted to the first recess 2514 of the connector seat, and a second insertion portion 3155, which is inserted to the second recess 2515 of the connector seat. The first insertion portion 3154 is formed in a shape of a pair of fins, which protrude from the first bent portion 3114 beyond the first inclined portion 3112. The insertion protrusions 3151 are formed at tip ends of the first insertion portion 3154 and have a semi-circular shape when viewing the bracket 3100 from the front. An insertion slot 3117, to which the insertion protrusion 2534 of the connector seat are inserted, is formed between said fins constituting the first insertion portion 3154. The second insertion portion 3155 is formed in a shape of a pair of fins, which protrude from the second bent portion 3115 beyond the second inclined portion 3113.

The snap slots 3152 are formed on the surface of the lateral flange 3141 below the flat surface 3131 of the contact surface of the bottom wall 3110. The length of each snap slot 3152 is longer than the distance between the snap protrusions 2532 located in a lateral edge of the connector seat 2500. Portions of the lateral flange 3141 below each snap slot 3152 (a portion of an edge of the lateral flange 3141 located opposite the snap slot 3152) protrude outwardly and thereby the flange 3140 includes a pair of ear portions 3144. The ear portions 3144 of the flange are formed in the position corresponding to the auxiliary stepped surfaces 2524 of the stepped surface 2520 of the connector seat. Accordingly, if the bracket 3100 is rotated to the connector seat 2500, the snap protrusions 2532 pass the ear portion 3144 and then snap-engage the snap slots 3152. The positioning slots 3153 are perforated in the flat portion 3111 of the bottom wall 3110. If the bracket 3100 is rotated to the connector seat 2500, the positioning ridges 2533 of the connector seat are inserted or fitted to the positioning slots 3153 of the bracket 3100.

Figure 28:
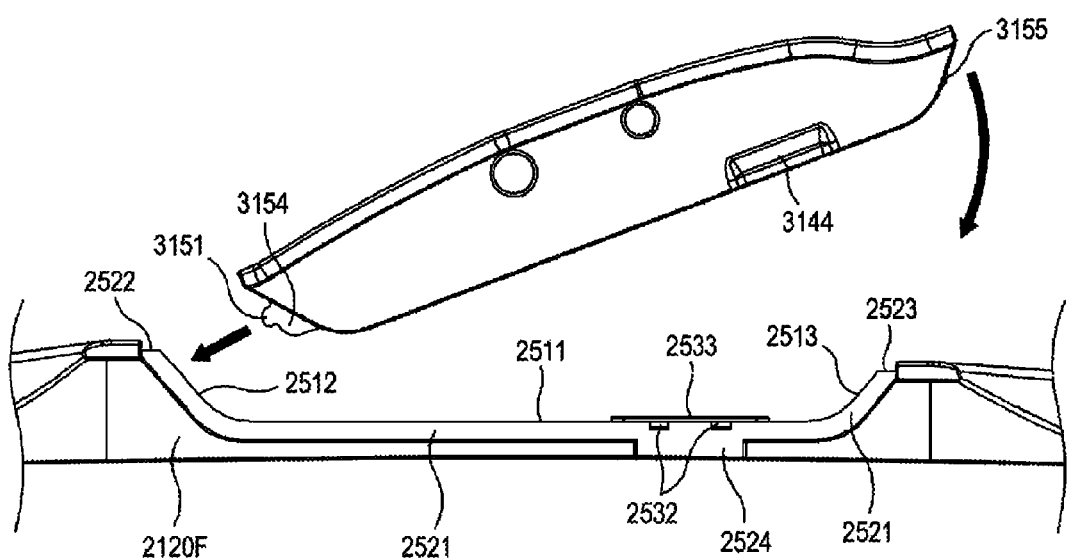
FIG. 28 shows an assembly example between a connector seat of the lever assembly and the bracket of the connector assembly.

As shown in FIG. 28, when the bracket 3100 is coupled to the connector seat 2500, first, the one end of the bracket 3100, at which the insertion protrusions 3151 are located, is tilted lower than the opposite end of the bracket and then the insertion protrusions 3151 of the bracket are inserted to the insertion slots 2531 of the connector seat. When the first insertion portion 3154 located at the first bent portion 3114 contacts the wall surface of the first recess 2514 of the connector seat, the insertion is completed. If the insertion is completed, the insertion protrusions 3151 of the bracket are inserted in the insertion slots 2531 of the connector seat and the insertion protrusion 2534 of the connector seat is inserted to the insertion slot 3117 of the bracket. Thereafter, the bracket 3100 is rotated towards the connector seat 2500 about the insertion protrusions 3151. As the bracket 3100 is rotated, the snap protrusions 2532 snap-engage the snap slots 3152, the positioning ridges 2533 are inserted to the positioning slots 3153 and the second insertion portion 3155 is fitted to the second recess 2515. If the bracket 3100 is coupled to the connector seat 2500, the flange 3140 of the bracket 3100 fits on the stepped surface 2520 of the connector seat and the ear portions 3144 of the flange 3140 are positioned immediately above the auxiliary stepped surfaces 2524. The user can identify the coupling position of the bracket 3100 relative to the connector seat 2500 by matching the ear portion 3144 of the flange 3140 with the auxiliary stepped surface 2524 of the connector seat 2500. Further, if the bracket 3100 is coupled to the connector seat 2500, the ear portions 3144 protrude outwardly of the bracket 3100 above the auxiliary stepped surfaces 2524. Accordingly, when separating the bracket 3100 from the connector seat 2500, the ear portion 3144 can serve as a part that the user can push with his finger, or any tool can be inserted between the ear portion 3144 and the auxiliary stepped surface 2524.

Figure 29:
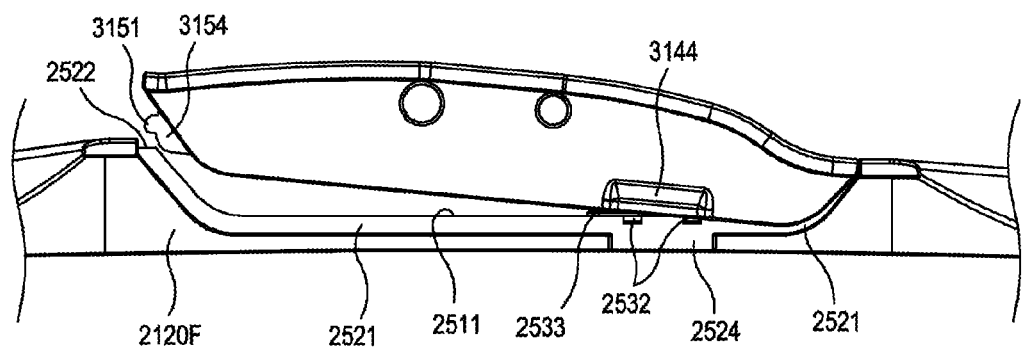
FIG. 29 shows an example where the bracket is not assembled with the connector seat.
Figure 30:
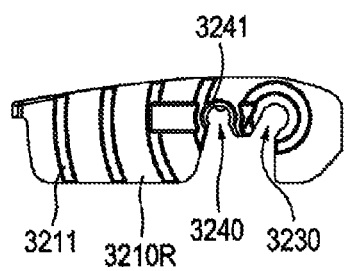
FIG. 30 is a rear view of an adaptor of the connector assembly shown in FIG. 21.
Figure 31:
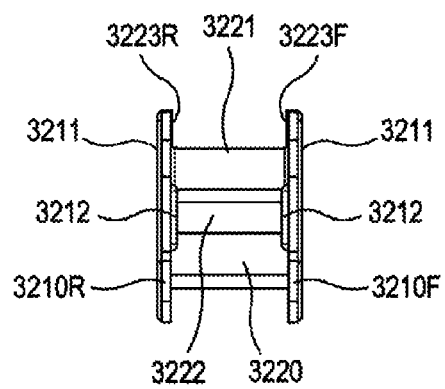
FIG. 31 is a right side view of the adaptor of the connector assembly shown in FIG. 21.
Figure 32:
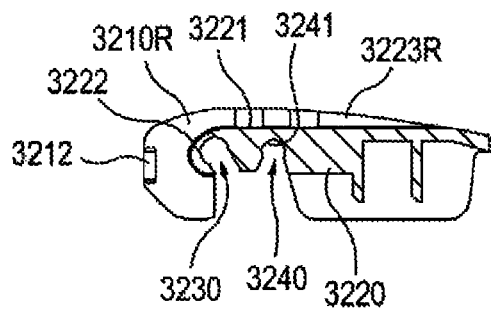
FIG. 32 is a longitudinal sectional view of the adaptor of the connector assembly shown in FIG. 21.
Figure 33:
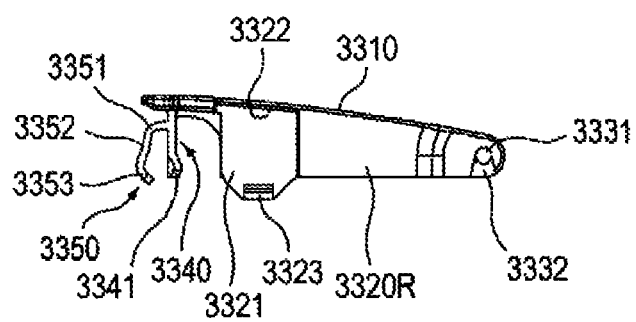
FIG. 33 is a rear view of a rotation cover of the connector assembly shown in FIG. 21.
Figure 34:
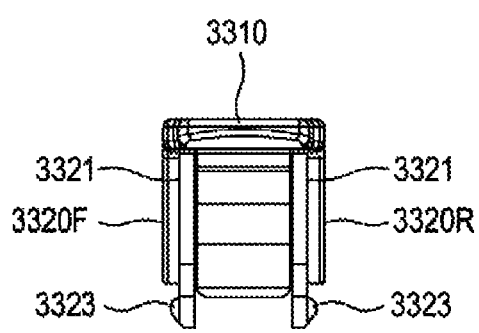
FIG. 34 is a right side view of the rotation cover of the connector assembly shown in FIG. 21.
Figure 35:
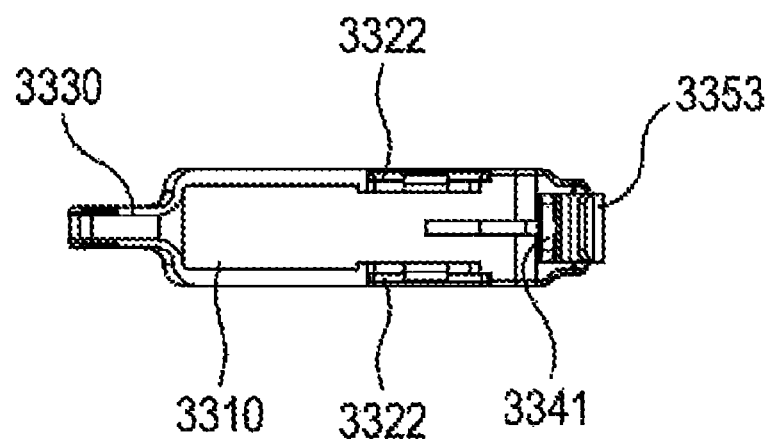
FIG. 35 is a bottom view of the rotation cover of the connector assembly shown in FIG. 21.
Figure 36:
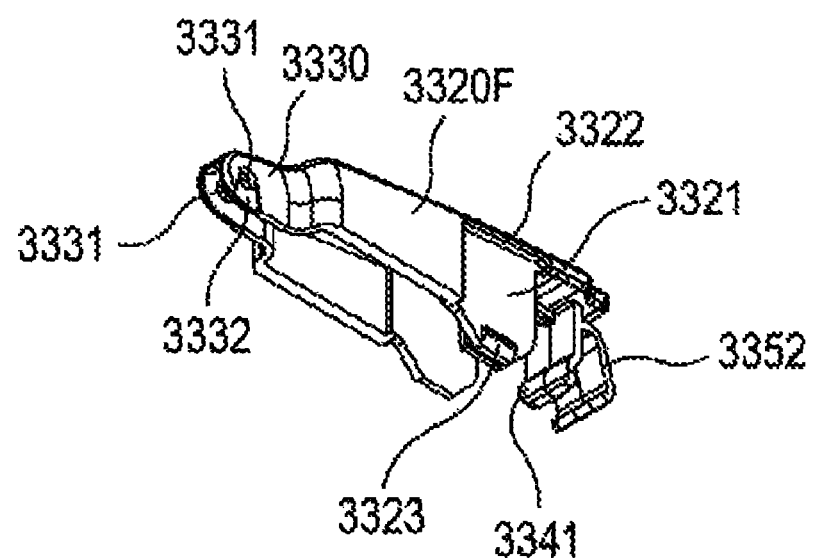
FIG. 36 is a lower perspective view of the rotation cover of the connector assembly shown in FIG. 21.

Further, in the connector seat 2500 and the connector assembly 3000, the distance between the longitudinal inner ends of the stepped surface 2520 (i.e., the longitudinal inner end of the first top stepped surface 2522 and the longitudinal inner end of the second top stepped surface 2523) is shorter than the distance between the tip end of the insertion protrusion 3151 and the edge of the flange 3140 (the longitudinal outer end of the second top flange 3143), which is located opposite the insertion protrusion 3151. Furthermore, the first top stepped surface 2522 located adjacent to the insertion slots 2531 is higher than the second top stepped surface 2523 located opposite the insertion slots 2531. That is, the longitudinal inner end of the first top stepped surface 2522 of the stepped surface 2520 is higher than the longitudinal inner end of the second top stepped surface 2523 relative to the bottom edge of the first lever 2100. Thus, as shown in FIG. 29, the bracket 3100 is not allowed to be joined to the connector seat 2500 through such a way of inserting the second insertion portion 3155 of the bracket 3100 to the second recess 2515 and then bringing the second top flange 3142 into contact with the second top stepped surface 2523. Accordingly, the user or worker can readily identify the accurate coupling position of the bracket 3100 relative to the connector seat 2500.

The bracket 3100 includes a pivot shaft 3121 to which the adaptor 3200 is rotatably coupled. The pivot shaft 3121 extends between the lateral walls 3120F, 3120R in a width direction orthogonal to a longitudinal direction of the bracket 3100 and serves as a rotation center of the adaptor 3200. Further, the bracket 3100 has a pair of fitting protrusions 3118 for rotatable attachment of the rotation cover 3300. The fitting protrusions 3118 protrude on inner surfaces of an insertion slot 3117, which is formed midway in the first bent portion 3114 of the bottom wall.

Further, to fix the rotation cover 3300, the bracket 3100 includes a liner protrusion 3122, which is located in an inner surface of each lateral wall 3120F, 3120R, and a snap opening 3123 located below the liner protrusion 3122. The liner protrusion 3122 has a shape of a flat plate. The snap opening 3123 is perforated from the liner protrusion 3122 to the flat portion 3111 of the bottom wall. An edge portion of the rotation cover 3300 is seated on a top edge of the liner protrusion 3122 and a snap protrusion of the rotation cover 3300 snap-engages a top edge of the snap opening 3123.

Further, the bracket 3100 has through holes to which the pin portions 311, 321 of the side pin wiper arm 300 are inserted. A pair of first through holes 3124, through which the pin portion 311 of the side pin wiper arm passes, are formed in the lateral walls 3120F, 3120R in the width direction of the bracket 3100. A pair of second through holes 3125, through which the pin portion 321 of the side pin wiper arm passes, are formed in the lateral walls 3120F, 3120R in the width direction of the bracket 3100. The first through hole 3124 is located between the liner protrusion 3122 and the pivot shaft 3121. The second through hole 3125 is located opposite the first through hole 3124 with respect to the pivot shaft 3121. The second through hole 3125 is smaller than the first through hole 3124.

Descriptions are made as to the adaptor 3200 with reference to FIGS. 21, 22 and 30 to 32.

The adaptor 3200 is fitted in between the lateral walls 3120F, 3120R of the bracket 3100 and is rotatably coupled to the pivot shaft 3121 of the bracket 3100. The adaptor 3200 is configured to support at least a portion of the linear portion 211 of the hook coupling unit 210 and to receive the hook portion 212 therein. Further, the adaptor 3200 is configured to engage the pin portion 321 of the pin coupling unit 320 and to fix the pin portion 321 to the bracket 3100.

The adaptor 3200 has a pair of lateral walls 3210F, 3210R and a bridge portion 3220 interconnecting the lateral walls 3210F, 3210R. The linear portion 211 and the hook portion 212 of the hook coupling unit 210 are situated between the lateral walls 3210F, 3210R. The extension portion 213 of the hook coupling unit 210 is situated below the bridge portion 3220. A plurality of arcuate ridges 3211, which frictionally contact the inner surfaces of the lateral walls 3120F, 3120R of the bracket 3100, protrude on an outer surface of each lateral wall 3210F, 3210R. The bridge portion 3220 extends between the lateral walls 3210F, 3210R from a rear end of the lateral wall 3210F, 3210R to the vicinity of a frontal end of the lateral wall. A frontal end of the bridge portion 3220 is spaced apart from the frontal end of the lateral wall 3210F, 3210R.

The bridge portion 3220 includes a flat seat surface 3221 on which the linear portion 211 of the hook coupling unit 210 is seated. The flat seat surface 3221 is a flat top surface of the bridge portion 3220 and is slightly declined with respect to top edges of the lateral walls 3210F, 3210R. Thus, stepped portions 3223F, 3223R are defined between the flat seat surface 3221 and the top edges of the lateral walls 3210F, 3210R. The stepped portions 3223F, 3223R contact the linear portion 211 of the hook coupling unit 210 in a lateral direction, thereby receiving forces applied in an oscillation direction during oscillation of the hook wiper arm 200. Further, the bridge portion 3220 includes a curved seat surface 3222 contacting the hook portion 212 of the hook coupling unit 210. A frontal surface of the bridge portion 3220, which extends from the flat seat surface 3221, is rounded such that the inner surface 215 of the hook portion 212 is seated thereon, thereby forming the curved seat surface 3222 for fixation of the hook portion 212. The lateral walls 3210F, 3210R have a pair of inwardly protruding engagement protrusions 3212 at the frontal ends thereof. The engagement protrusions 3212 are located opposite the curved seat surface 3222. The outer surface 214 of the hook portion 212 of the hook coupling unit 210 engages the engagement protrusions 3212.

The adaptor 3200 includes a slot 3230 for coupling to the pivot shaft 3121 of the bracket 3100. When viewing the adaptor 3200 from the front, the slot 3230 extends from bottom edges of the later walls 3210F, 3210R to the vicinity of the frontal end of the bridge portion 3220. An inner surface of the slot 3230 is rounded and the pivot shaft 3121 of the bracket 3100 is fitted to the slot 3230. A distance between the slot 3230 and the top edge of the lateral wall 3210F, 3210R is determined such that the top edges of the lateral walls 3210F, 3210R and the top edges of the lateral walls 3120F, 3120R of the bracket are positioned approximately at the same level in the state where the adaptor 3200 is coupled to the pivot shaft 3121 and then is rotated to the inside of the bracket 3100.

The adaptor 3200 includes a bearing hole 3240 located adjacent to the slot 3230. The pin portion 321 of the pin coupling unit 320 of the side pin wiper arm 300 is fitted to the bearing hole 3240. An engagement protrusion 3241 is formed in an inner surface of the bearing hole 3240 approximately midway in its width direction in a circumferential direction. When viewing the adaptor 3200 from the front, the engagement protrusion 3241 is formed in a C shape. The engagement protrusion 3241 engages the annular groove 322 of the pin portion 321 of the pin coupling unit 320. A distance between the bearing hole 3240 and the slot 3230 corresponds to a distance between the pivot shaft 3121 and the second through hole 3125 of the bracket 3100.

Descriptions are made as to the rotation cover 3300 with reference to FIGS. 21, 22 and 33 to 36.

The rotation cover 3300 is rotatably attached to the bracket 3100. The rotation cover 3300 participates in the fixation between the hook portion 212 of the hook coupling unit 210 and the adaptor 3200 as well as the fixation between the pin portion 311 of the pin coupling unit 310 and the bracket 3100.

The rotation cover 3300 has a top wall 3310 and a pair of lateral walls 3320F, 3320R downwardly extending from lateral edges of the top wall 3310. A frontal end of the top wall 3310 protrudes more frontward than the frontal ends of the lateral walls 3320F, 3320R, thereby forming an empty space between the frontal end of the top wall 3310 and the frontal ends of the lateral walls 3320F, 3320R when the rotation cover 3300 is viewed from the front. Further, the rotation cover 3300 has an insertion portion 3330 extending rearward from the rear ends of the top wall 3310 and the lateral walls 3320F, 3320R.

The rotation cover 3300 includes a pair of fitting holes 3331 for coupling to the bracket 3100 at the insertion portion 3330. The fitting protrusions 3118 of the bracket 3100 are fitted to the fitting holes 3331 of the insertion portion 3330, rotatably joining the rotation cover 3300 to the bracket 3100. Guide grooves 3332 are formed in the insertion portion 3330 from a bottom edge of the insertion portion 3330 to the fitting holes 3331. The guide grooves 3332 guide insertion of the fitting protrusions 3118.

The rotation cover 3300 has a concave recess 3321 in an outer surface of each lateral wall 3320F, 3320R for fixation to the bracket 3100. Thus, a stopper 3322 is formed between a top edge of the recess 3321 and the top wall 3310. Further, the rotation cover 3300 has a snap protrusion 3323, which protrudes outwardly, at a bottom edge of the recess 3321. If the rotation cover 3300 is rotated to the bracket 3100, the liner protrusion 3122 of the bracket 3100 contacts the stopper 3322 at its top edge and the snap protrusion 3323 of the rotation cover 3300 snap-engages the snap opening 3123 formed at the bottom edge of the liner protrusion 3122. Then, the rotation cover 3300 is not allowed to be rotated upwardly or downwardly due to the contact between the liner protrusion 3122 and the stopper 3322 and the engagement between the snap opening 3123 and the snap protrusion 3323.

Figure 22:
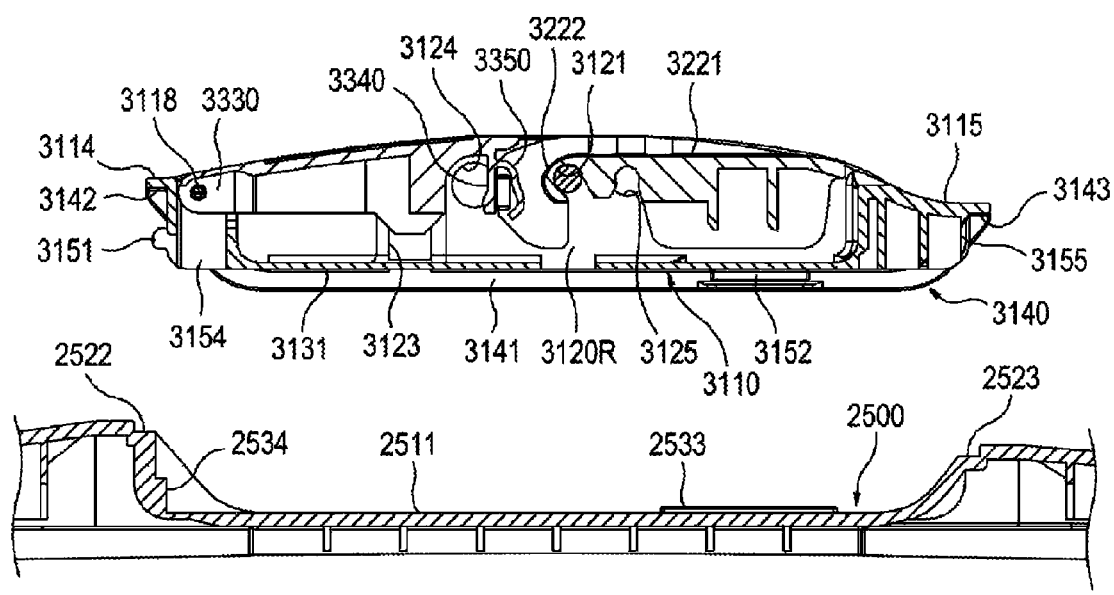
FIG. 22 shows a longitudinal sectional view of the connector assembly and a fragmental longitudinal sectional view of the first lever.
Figure 23:
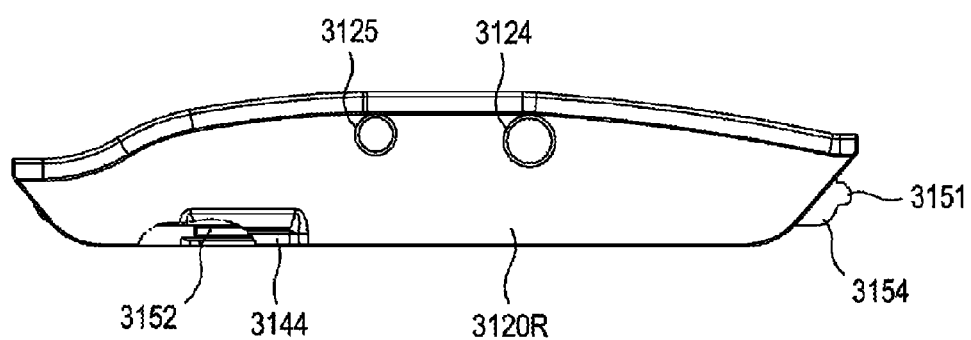
FIG. 23 is a rear view of a bracket of the connector assembly shown in FIG. 21.
Figure 24:
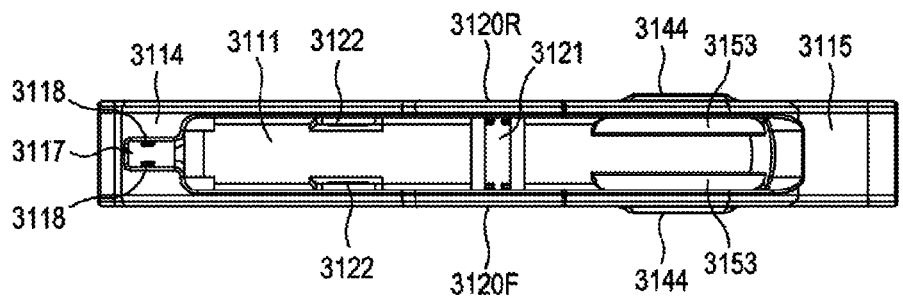
FIG. 24 is a top view of the bracket of the connector assembly shown in FIG. 21.
Figure 25:
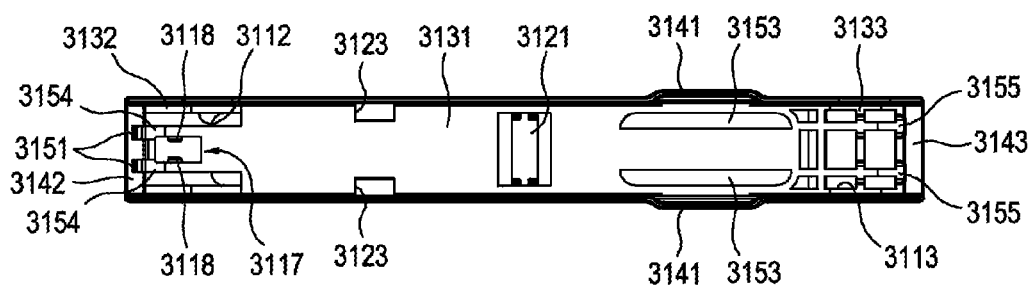
FIG. 25 is a bottom view of the bracket of the connector assembly shown in FIG. 21.
Figure 26:
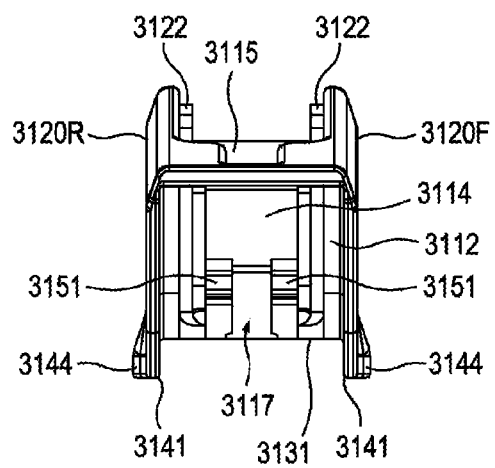
FIG. 26 is a left side view of the bracket of the connector assembly shown in FIG. 21.
Figure 27:
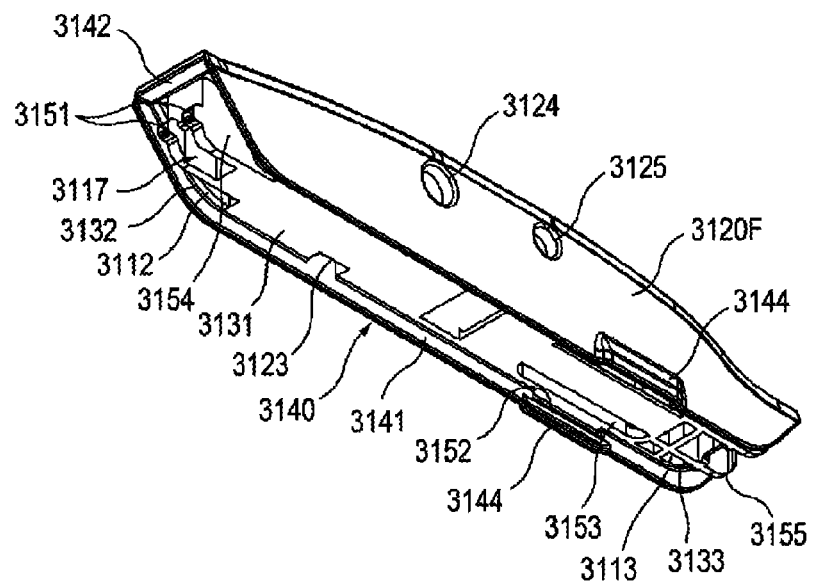
FIG. 27 is a lower perspective view of the bracket of the connector assembly shown in FIG. 21.

Accordingly, the rotation cover 3300 is rotatable between the following two positions: a fixation position where the stopper 3322 is in contact with the liner protrusion 3122 and the snap protrusion 3323 is in snap-engagement with the snap opening 3123; and a release position where the rotation cover is rotated upwardly of the bracket 3100 from such a fixation position. In the fixation position, the rotation cover 3300 fixes the hook portion 212 of the hook coupling unit 210 to the adaptor 3200. Further, in the fixation position, the rotation cover 3300 fixes the pin portion 311 of the pin coupling unit 310 to the bracket 3100. As shown in FIG. 22, when viewing the connector assembly 3000 from the front, the top edges of the lateral walls 3120F, 3120R of the bracket and the top edge of the top wall 3310 of the rotation cover 3300 are positioned at the same level in the fixation position of the rotation cover 3300. If the rotation cover 3300 is rotated upwardly of the bracket 3100 from the fixation position and is moved to the release position, then the fixation for the hook portion 212 or the fixation for the pin portion 311 is released. The release position may be any position located between: the position where the snap protrusion 3323 of the rotation cover 3300 is separated from the snap opening 3123; and the maximum rotation position of the rotation cover 3300 relative to the bracket 3100.

The rotation cover 3300 includes a first elastic latch 3340 fixing the pin portion 311 of the pin coupling unit 310 with respect to the bracket 3100 and a second elastic latch 3350 fixing the hook portion 212 of the hook coupling unit 210 with respect to the adaptor 3200. The first and second elastic latches 3340, 3350 may be formed in the shape of an elastic bar that downwardly protrudes from an under surface of the top wall 3310 of the rotation cover 3300. The first elastic latch 3340 downwardly protrudes from the under surface of the top wall 3310 and the second elastic latch 3350 protrudes frontward and downwardly from the first elastic latch 3340.

When viewing the rotation cover 3300 from the front, the first elastic latch 3300 has a curved portion 3341, which is convex towards the rear end of the rotation cover 3300, at its bottom end. Further, when viewing the connector assembly 3000 from the front, if the rotation cover 3300 is fixed to the bracket 3100 in the fixation position, then the first elastic latch 3340 is positioned in the first through holes 3124 of the bracket 3100 (see FIG. 22). The pin portion 311 of the pin coupling unit 310 is inserted to the connector assembly 3000 through such a way of being inserted to the first through holes 3124 of the bracket 3100. If the rotation cover 3300 is fixed to the bracket 3100 in the fixation position, the first elastic latch 3340 engages the annular groove 312 of the pin coupling unit 310 at the curved portion 3341, thereby clamping the pin coupling unit 310 to the connector assembly 3000.

The second elastic latch 3350 fixes the hook portion 212 of the hook coupling unit 210 to the curved seat surface 3222 of the adaptor 3200. If the rotation cover 3300 is fixed to the bracket 3100 in the fixation position, then a frontal surface of the second elastic latch 3350 comes into abutment with the outer surface 214 of the hook portion 212. Thus, the hook portion 212 is pressed against the curved seat surface 3222 by the elastic force of the second elastic latch 3350 and comes into close contact therewith. When viewing the rotation cover 3300 from the front, the second elastic latch 3350 includes: a first curved portion 3351 extending from the first elastic latch 3340 and being curved frontward; a second curved portion 3352 extending from the first curved portion 3351 and being curved reversely to the first curved portion 3351; and a third curved portion 3353 extending from the second curved portion 3352 and being curved frontward in the same direction as the first curved portion 3351. If the rotation cover 3300 is fixed to the bracket 3100 in the fixation position, then the second curved portion 3352 of the second elastic latch 3350 comes into abutment with the outer surface 214 of the hook portion 212 of the hook coupling unit 210. Since the second elastic latch 3350 extends in a wavy shape through the first to third curved portions 3351, 3352, 3353, the second elastic latch 3350 can press the hook portion 212 of the hook coupling unit 210 against the curved seat surface 3222 of the adaptor 3200 with stronger pressure force.

FIG. 37 shows a connection example between the wiper blade 100 according to an embodiment and the hook wiper arm 200.

Referring to FIG. 37, in the state where the rotation cover 3300 is turned upward from the bracket 3100 and is in the release position, the extension portion 213 of the hook coupling unit 210 is inserted through between the lateral walls 3210F, 3210R of the adaptor 3200 from the frontal ends of the lateral walls 3210F, 3210R towards the underside of the bridge portion 3220. If the insertion is completed, the linear portion 211 of the hook coupling unit 210 is seated on the flat seat surface 3221 of the bridge portion 3220 between the stepped portions 3223F, 3223R, the inner surface 215 of the hook portion 212 is seated on the curved seat surface 3222 of the bridge portion 3220, and the extension portion 213 is situated below the bridge portion 3220. Further, if the insertion is completed, the engagement protrusions 3212 of the lateral walls 3210F, 3210R come into engagement with the outer surface 214 of the hook portion 212. Thereafter, the rotation cover 3300 is fixed to the bracket 3100 in the fixation position by rotating the rotation cover 3300 towards the bracket 3100. When the rotation cover 3300 is completely fixed, the second elastic latch 3350 of the rotation cover 3300 comes into contact with the outer surface 214 of the hook portion 212 at the frontal surface of the second curved portion 3352 and, thus, the second elastic latch 3350 fixes the hook portion 212 by pressing the hook portion 212 against the curved seat surface 3222. Accordingly, the hook coupling unit 210 is fixed to the connector assembly 3000 in the state where the linear portion 211 is positioned between the stepped portions 3223F, 3223R of the adaptor 3200 and the hook portion 212 is pressed against the curved seat surface 3222 of the adaptor 3200.

Figure 39:
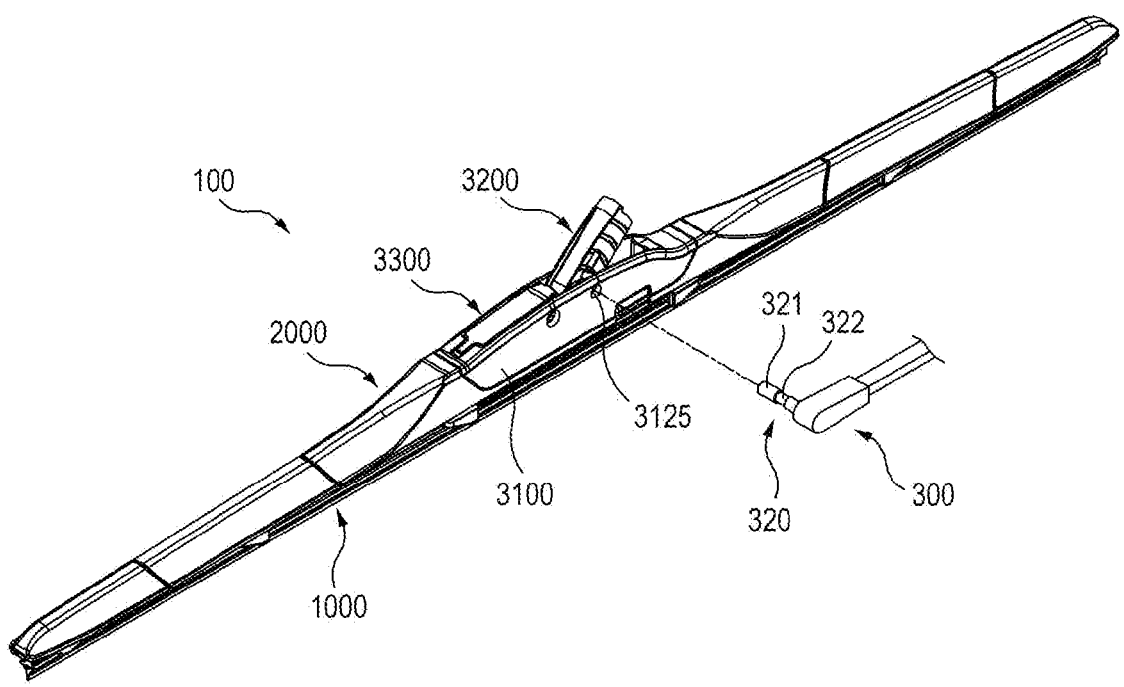
FIG. 39 shows a connection example between the wiper blade according to an embodiment and another pin portion of a side pin wiper arm.

FIGS. 38 and 39 show a connection example between the wiper blade 100 according to an embodiment and the side pin wiper arm 300.

The wiper blade 100 is connected to the side pin wiper arm 300 in such a way that the pin portion 311, 321 of the pin coupling unit 310, 320 passes through the connector assembly 3000. As shown in FIG. 38, in the state where the rotation cover 3300 is turned upward from the bracket 3100 and is positioned in the release position, the pin portion 311 of the pin coupling unit 310 is inserted into the bracket 3100 through the first through hole 3124 of the bracket 3100 and then protrudes through the opposite first through hole 3124. After the pin portion 311 of the pin coupling unit 310 passes through the bracket 3100 of the connector assembly 3000, the rotation cover 3300 is fixed to the bracket 3100 in the fixation position by rotating the rotation cover 3300 towards the bracket 3100. Then, the curved portion 3341 of the first elastic latch 3340 of the rotation cover 3300 comes into engagement with the annular groove 312 of the pin portion 311, thereby fixing the pin portion 311 of the pin coupling unit 310 to the connector assembly 3000. As shown in FIG. 39, in the state where the adaptor 3200 is slightly tilted from the bracket 3100 such that the rear end of the adaptor 3200 is raised up, the pin portion 321 of the pin coupling unit 320 is inserted into the bracket 3100 through the second through hole 3125 of the bracket 3100 and then protrudes through the opposite second through hole 3125. Thereafter, the adaptor 3200 is rotated towards the bracket 3100 and therefore the pin portion 321 is fitted to the bearing hole 3240 of the adaptor 3200. If the pin portion 321 is fitted to the bearing hole 3240, the engagement protrusion 3241 of the bearing hole 3240 comes into engagement with the annular groove 322 of the pin portion 321, thereby fixing the pin portion 321 of the pin coupling unit 320 to the connector assembly 3000.

The wiper blade 100 in accordance with an embodiment may include a connector assembly other than the above-described connector assembly 3000. In some embodiments, the wiper blade 100 includes a connector assembly configured to be connected to other types of wiper arms other than the above-described hook wiper arm 200 and side pin wiper arm 300. Such a connector assembly includes a bracket, a portion of which is common with the above-described bracket 3100. Parts for connection to said other types of wiper arms are attached to or integrated with said bracket of such a connector assembly. That is, the bracket of the connector assembly of some embodiments includes elements for coupling to the connector seat 2500 of the first lever 2100, such as the insertion protrusion 3151, the snap slot 3152, the lateral flange 3141, the first and second top flanges 3142, 3143, the ear portion 3144, etc.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wiper blade, comprising:
a wiper rubber;
a lever assembly holding the wiper rubber, the lever assembly comprising a plurality of levers, adjacent levers of which are rotatably connected;
a connector seat provided in a first lever among the plurality of levers, the first lever being centrally located in the lever assembly; and
a connector assembly detachably joined to the connector seat and detachably connected to a distal end of a wiper arm,
wherein at least one of the plurality of levers has an inclined surface defining a partial spoiler extending in a longitudinal direction of the lever assembly,
wherein the connector seat includes:
a seat surface on which the connector assembly is seated;
a stepped surface that extends along a periphery of the seat surface and encircles the seat surface to separate the seat surface from portions of the first lever outside the stepped surface;
an insertion slot provided at a longitudinal end of the seat surface; and
a pair of snap protrusions located adjacent to the seat surface apart from the insertion slot,
wherein the connector assembly includes:
a contact surface contacting the seat surface;
a flange that extends along a periphery of the contact surface and fits on the stepped surface;
an insertion protrusion inserted to the insertion slot of the connector seat; and
a pair of snap slots which the pair of snap protrusions of the connector seat snap-engage respectively,
wherein the pair of snap slots are located above a bottom edge of the flange, and
wherein the connector assembly is joined to the connector seat by inserting the insertion protrusion to the insertion slot and then rotating the connector assembly towards the connector seat and thus bringing the snap protrusions into snap-engagement with the snap slots.

2. The wiper blade of claim 1, wherein the flange includes an ear portion formed by a portion of an edge of the flange which is opposite each of the snap slots and protrudes outwardly.

3. The wiper blade of claim 1, wherein the seat surface comprises: a flat surface extending longitudinally and being lower than a top edge of the first lever; and inclined surfaces inclined from respective longitudinal outer ends of the flat surface towards respective longitudinal outer ends of the first lever,
wherein the connector seat includes a recess in one of the inclined surfaces and the connector assembly includes an insertion portion inserted to the recess, and
wherein the insertion slot is formed in the recess and the insertion protrusion is located at a tip end of the insertion portion.

4. The wiper blade of claim 3, wherein a distance between longitudinal inner ends of the stepped surface is less than a distance between a tip end of the insertion protrusion and an edge of the flange located opposite the insertion protrusion, and
wherein one of the longitudinal inner ends of the stepped surface is higher than the other of the longitudinal inner ends of the stepped surface.

5. A wiper blade, comprising:
a wiper rubber;
a first lever having two first inclined surfaces that extend longitudinally and are spaced apart from each other;
a pair of second levers rotatably connected to respective longitudinal outer ends of the first lever and having a finger for grasping the wiper rubber at a longitudinal inner or outer end thereof, each of the second levers having a second inclined surface extending longitudinally;
a pair of third levers rotatably connected to respective longitudinal inner or outer ends of the second levers opposite the respective fingers of the second levers, each of the third lever having fingers for grasping the wiper rubber at respective longitudinal ends thereof;
a connector seat provided in the first lever between the first inclined surfaces; and
a connector assembly detachably connected to a distal end of a wiper arm and including a bracket detachably joined to the connector seat, wherein the connector seat includes:
a seat surface on which the bracket is seated;
a stepped surface extending along a periphery of the seat surface and encircling the seat surface to separate the seat surface from portions of the first lever outside the stepped surface;
an insertion slot provided at a longitudinal end of the seat surface; and
a pair of snap protrusions located adjacent to the seat surface apart from the insertion slot and protruding in a direction orthogonal to a longitudinal direction of the seat surface,
wherein the bracket includes:
a contact surface contacting the seat surface;
a flange extending along a periphery of the contact surface and fitting on the stepped surface;
an insertion protrusion inserted to the insertion slot of the connector seat; and
a pair of snap slots which the pair of snap protrusions of the connector seat snap-engage respectively, the pair of snap slots being located above a bottom edge of the flange.

6. The wiper blade of claim 5, the flange includes an ear portion formed by a portion of an edge of the flange which is opposite each of the snap slots and protrudes outwardly.

7. The wiper blade of claim 6, wherein the connector seat includes an auxiliary stepped surface between the stepped surface and a bottom edge of the first lever, the auxiliary stepped surface being continued from the stepped surface, and
wherein the auxiliary stepped surface is located below the snap protrusion.

8. The wiper blade of claim 5, wherein the seat surface comprises: a flat surface extending longitudinally and being lower than a top edge of the first lever; and inclined surfaces inclined from respective longitudinal outer ends of the flat surface towards respective longitudinal outer ends of the first lever,
wherein the connector seat includes a recess in one of the inclined surfaces and the bracket includes an insertion portion inserted to the recess, and
wherein the insertion slot is formed in the recess and the insertion protrusion is located at a tip end of the insertion portion.

9. The wiper blade of claim 8, wherein the stepped surface comprises: a lateral stepped surface adjoining lateral edges of the flat surface and the inclined surfaces; and first and second top stepped surfaces adjoining top ends of the inclined surfaces respectively,
wherein the first top stepped surface is adjacent to the insertion slot and is higher than the second top stepped surface, and
wherein a distance between a longitudinal inner end of the first top stepped surface and a longitudinal inner end of the second top stepped surface is less than a distance between a tip end of the insertion protrusion and an edge of the flange located opposite the insertion protrusion.

10. The wiper blade of claim 8, wherein the connector seat includes a positioning ridge protruding from the flat surface and the bracket includes a positioning slot, to which the positioning ridge is fitted, in the contact surface.

11. The wiper blade of claim 5, wherein the first lever and the second lever are rotatably connected to each other by fitting between a pair of fitting protrusions provided in one of the first and second levers and a pair of fitting holes provided in the other of the first and second levers, and
wherein the second lever and the third lever are rotatably connected to each other by fitting between a pair of fitting protrusions provided in one of the second and third levers and a pair of fitting holes provided in the other of the second and third levers.

12. The wiper blade of claim 5, wherein the finger of the second lever is located at the longitudinal inner end of the second lever,
wherein the third lever has a third inclined surface extending longitudinally and is rotatably connected to the longitudinal outer end of the second lever, and
wherein the third lever includes a pressing portion that is located opposite to the finger located at the longitudinal outer end thereof and presses the wiper rubber against the finger located at the longitudinal outer end thereof.

13. The wiper blade of claim 5, wherein the first lever has an end surface, which is inclined towards a longitudinal outer end of the third lever, at the longitudinal outer end thereof,
wherein the second lever has a stepped surface, which is contactable to the end surface of the first lever and is inclined towards the longitudinal outer end of the third lever, and an end surface, which is inclined towards the longitudinal outer end of the third lever, at the longitudinal outer end thereof,
wherein the third lever has a stepped surface which is contactable to the end surface of the second lever and is inclined towards the longitudinal outer end of the third lever, and
wherein the stepped surface of the third lever is inclined towards the longitudinal outer end of the third lever at an angle less than the stepped surface of the second lever.

* * * * *